US011943373B2

(12) United States Patent
Li et al.

(10) Patent No.: US 11,943,373 B2
(45) Date of Patent: Mar. 26, 2024

(54) METHOD FOR ISSUING IDENTITY CERTIFICATE TO BLOCKCHAIN NODE AND RELATED APPARATUS

(71) Applicant: Tencent Technology (Shenzhen) Company Limited, Shenzhen (CN)

(72) Inventors: Mao Cai Li, Shenzhen (CN); Zong You Wang, Shenzhen (CN); Kai Ban Zhou, Shenzhen (CN); Chang Qing Yang, Shenzhen (CN); Hu Lan, Shenzhen (CN); Li Kong, Shenzhen (CN); Jin Song Zhang, Shenzhen (CN); Yi Fang Shi, Shenzhen (CN); Geng Liang Zhu, Shenzhen (CN); Qu Cheng Liu, Shenzhen (CN); Qiu Ping Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 472 days.

(21) Appl. No.: 17/337,029

(22) Filed: Jun. 2, 2021

(65) Prior Publication Data

US 2021/0288819 A1 Sep. 16, 2021

Related U.S. Application Data

(63) Continuation of application No. PCT/CN2020/075467, filed on Feb. 17, 2020.

(30) Foreign Application Priority Data

Mar. 7, 2019 (CN) .......................... 201910173224.5

(51) Int. Cl.
*H04L 9/32* (2006.01)
*H04L 9/00* (2022.01)

(52) U.S. Cl.
CPC ............ *H04L 9/3263* (2013.01); *H04L 9/321* (2013.01); *H04L 9/3236* (2013.01); *H04L 9/50* (2022.05)

(58) Field of Classification Search
CPC ..... H04L 9/3263; H04L 9/321; H04L 9/3236; H04L 9/50; H04L 9/3239; H04L 9/3268; G06F 21/64; G06Q 40/00
See application file for complete search history.

(56) References Cited

U.S. PATENT DOCUMENTS

| 10,547,457 | B1* | 1/2020 | Duccini | .................... H04L 9/50 |
| 11,063,760 | B2* | 7/2021 | Subba | ..................... H04L 9/085 |
| 2022/0174490 | A1* | 6/2022 | Xie | ........................... H04L 9/50 |

FOREIGN PATENT DOCUMENTS

| CN | 105635049 A | 6/2016 |
| CN | 106452796 A | 2/2017 |

(Continued)

OTHER PUBLICATIONS

International Search Report and Written Opinion received for Application No. PCT/CN2020/075467 dated May 19, 2020 (English and Chinese languages), 9 pages.

*Primary Examiner* — Christopher A Revak
(74) *Attorney, Agent, or Firm* — Crowell & Moring LLP

(57) ABSTRACT

An identity certificate may be issued to a blockchain node. The issuance may include issuing a first identity certificate to a first terminal and receiving a second identity certificate issuance request that is from the first terminal. A second identity certificate may be issued to the first terminal, and a third identity certificate issuance request is received from the second terminal. A third identity certificate is issued to the second terminal, so that the second terminal forwards the third identity certificate to the third terminal.

20 Claims, 15 Drawing Sheets

(56) References Cited

FOREIGN PATENT DOCUMENTS

| | | | | | |
|---|---|---|---|---|---|
| CN | 107426157 | A | | 12/2017 | |
| CN | 107592293 | A | | 1/2018 | |
| CN | 108200046 | A | | 6/2018 | |
| CN | 108881252 | A | | 11/2018 | |
| CN | 109948371 | A | | 6/2019 | |
| CN | 110011988 | A | * | 7/2019 | ............. H04L 29/06 |
| CN | 110189190 | A | * | 8/2019 | ............. G06Q 30/06 |
| CN | 111222174 | A | * | 6/2020 | ............. G06F 21/64 |
| EP | 3401865 | A1 | * | 11/2018 | ............. G06Q 20/38 |
| JP | 10-215245 | A | | 8/1998 | |
| JP | 2018-182487 | A | | 11/2018 | |
| KR | 20180079805 | A | * | 7/2018 | ............. G06Q 20/38 |
| WO | WO 2017-108783 | A1 | | 6/2017 | |
| WO | 2021172684 | A1 | * | 9/2021 | ............... H04L 9/32 |
| WO | 2022206247 | A1 | * | 10/2022 | ............. G06F 21/64 |

* cited by examiner

METHOD FOR ISSUING IDENTITY CERTIFICATE TO BLOCKCHAIN NODE AND RELATED APPARATUS

RELATED APPLICATIONS

This application is a bypass continuation application of PCT Patent App. No. PCT/CN2020/075467, filed on Feb. 17, 2020 and entitled "METHOD FOR ISSUING IDENTITY CERTIFICATE TO BLOCKCHAIN NODE AND RELATED APPARATUS", which claims priority to China Patent Application No. 201910173224.5, filed with the China National Intellectual Property Administration on Mar. 7, 2019 and entitled "METHOD FOR ISSUING IDENTITY CERTIFICATE TO BLOCKCHAIN NODE AND RELATED APPARATUS", both of which are incorporated herein by reference in their entirety.

FIELD OF THE TECHNOLOGY

This application relates to blockchain technology, and specifically, to issuing an identity certificate to a blockchain node in a blockchain network.

BACKGROUND OF THE DISCLOSURE

On the blockchain technology system, there are two design schemes: a public blockchain and a consortium blockchain. In the public blockchain system, any node can join a consensus system as an accounting node. In the consortium blockchain system, only a few nodes are opened as accounting nodes. In this way, when an ordinary node (that is, a node other than the accounting nodes) needs to chain transaction information to a blockchain, the ordinary node first transmits to-be-chained information to one of the few accounting nodes, and then, the accounting node chains the received information to the blockchain. It can be learned from the above that in the consortium blockchain system, in addition to ensuring the security of personal account information of a user through the security of a private key of the user, the real-world identity of the user needs to be bound with account information of the user on the blockchain, thereby achieving an access permission mechanism.

Generally, if an enterprise node wants to join the consortium blockchain, the enterprise node needs to first register as a member of the consortium blockchain before chaining and querying for formation through an accounting node. When chaining and querying are performed through the accounting node, nodes of both parties first need to determine whether an identity of the other party is a member of the consortium blockchain, and perform chaining and querying normally only if the identity of the other party is a member of the consortium blockchain. Whether the identity of the other party is a member of the consortium blockchain may be determined in such a way that a signature is added to a message, and the other party performs verification on the signature. For addition and verification of a signature, unique public and private keys need to be issued to each node. To ensure the authority of the public and private keys, an identity certificate needs to be issued to each successfully registered node, to ensure that the node is a node with a correct identity registered in the consortium blockchain. Therefore, for the consortium blockchain network, a mechanism for issuing and maintaining an identity certificate for a blockchain node joining the consortium blockchain is required for ensuring the verifiability of identity information of each blockchain node in communication.

Moreover, a blockchain network is a relatively complex blockchain network, and issuing an identity certificate in the blockchain network, such as in a taxation blockchain network, is also a technical problem to be resolved.

SUMMARY

This application provides a method and certificate authority system for issuing an identity certificate to a blockchain node in a blockchain network, a computer device, and a medium, to implement an identity certificate issuance process in a blockchain network.

According to an example embodiment of this application, a method for issuing an identity certificate to a blockchain node in a blockchain network is disclosed. The blockchain node in the blockchain network includes a first terminal, a second terminal, and a third terminal. The method is performed by a certificate authority system. The certificate authority system includes a first-tier certificate authority node, a second-tier certificate authority node, and a third-tier certificate authority node. The method includes:

issuing a first identity certificate to the first terminal through the first-tier certificate authority node;

receiving a second identity certificate issuance request that is from the first terminal and that is made by using the first identity certificate, the second identity certificate issuance request being generated in response to a registration request transmitted by the second terminal to the first terminal;

issuing a second identity certificate to the first terminal through the second-tier certificate authority node, so that the first terminal forwards the second identity certificate to the second terminal;

receiving a third identity certificate issuance request that is from the second terminal and that is made by using the second identity certificate, the third identity certificate issuance request being generated in response to a registration request transmitted by the third terminal to the second terminal having the second identity certificate; and issuing a third identity certificate to the second terminal through the third-tier certificate authority node, so that the second terminal forwards the third identity certificate to the third terminal.

According to an example embodiment of this application, a certificate authority system for issuing an identity certificate to a blockchain node in a blockchain network is disclosed. The blockchain node in the blockchain network includes a first terminal, a second terminal, and a third terminal. The certificate authority system includes:

a first-tier certificate authority node, configured to issue a first identity certificate to the first terminal;

a second-tier certificate authority node, configured to issue a second identity certificate to the first terminal in response to a second identity certificate issuance request that is from the first terminal and that is made by using the first identity certificate, so that the first terminal forwards the second identity certificate to the second terminal, the second identity certificate issuance request being generated in response to a registration request transmitted by the second terminal to the first terminal; and a third-tier certificate authority node, configured to issue a third identity certificate to the second terminal in response to a third identity certificate issuance request that is from the second terminal and that is made by using the second identity certificate, so that the second terminal forwards the third identity certificate to the third terminal, the third identity certificate issuance request being generated in response to a registration request transmitted by the third terminal to the second terminal having the second identity certificate.

According to an example embodiment of this application, a computer device is disclosed, including: a memory, configured to store computer-readable instructions; and a processor, configured to read the computer-readable instructions stored in the memory, to perform the foregoing method.

According to an example embodiment of this application, a storage medium is disclosed, including a stored program, the program, when run, performing the foregoing method.

According to an example embodiment of this application, a computer program product including instructions is further provided, the instructions, when run on a computer, causing the computer to perform the foregoing method.

In the embodiments of this application, the certificate authority system includes a first-tier certificate authority node, a second-tier certificate authority node, and a third-tier certificate authority node. First, a first identity certificate is issued to the first terminal through the first-tier certificate authority node. After obtaining the identity certificate, the first terminal is entitled to receive registration requests from subordinate second terminals, and request second identity certificates for the second terminals. The second identity certificate is issued by the second-tier certificate authority node. The first terminal uses the first identity certificate issued to itself to request issuing a second identity certificate to a second identity certificate. In this way, the issued second identity certificate is ensured by a legitimate first terminal. After obtaining the second identity certificate, the second terminal is entitled to receive registration requests from subordinate third terminals, and request third identity certificates for the third terminals. The third identity certificate is issued by the third-tier certificate authority node. The second terminal uses the second identity certificate issued to itself to request issuing a third identity certificate to a subordinate grassroots unit. In this way, the issued third identity certificate is ensured by a legitimate second terminal. In such a manner that the identity certificate at each tier is ensured by the issued identity certificate at an upper tier, the security of issuing identity certificates at different tiers is ensured, different permission control requirements of blockchain nodes at all tiers in the blockchain network are satisfied, and the effectiveness of the internal permission control of the blockchain network is improved.

In one embodiment, a non-transitory computer readable medium has stored therein computer program instructions, the computer program instructions, when executed by a processor, cause the processor to implement any of the embodiments described above.

Other features and advantages of this application become obvious through the following detailed descriptions, or may be partially learned through the practice of this application.

It is to be understood that the foregoing general descriptions and the following detailed descriptions are merely exemplary, and cannot limit this application.

BRIEF DESCRIPTION OF THE DRAWINGS

The above and other objectives, features, and advantages of this application will become more apparent from the detailed description of example embodiments of this application with reference to the accompanying drawings.

DESCRIPTION OF EMBODIMENTS

Figure 1A:
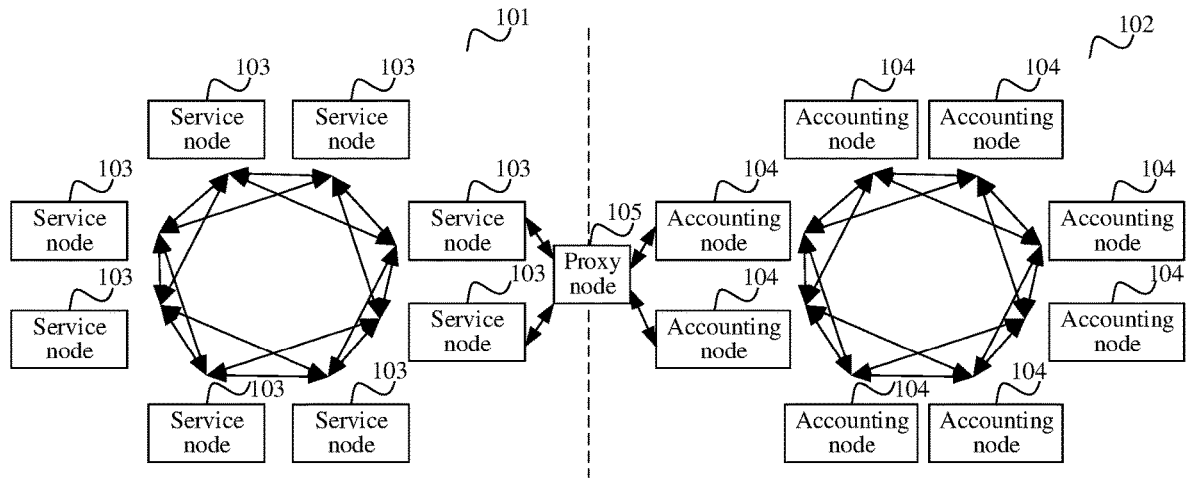
FIG. 1A is an overall architecture diagram of a blockchain network to which a method for issuing an identity certificate to a blockchain node in a taxation blockchain network according to an embodiment of this application is applicable.

Example implementations are described more comprehensively with reference to the accompanying drawings. However, the example implementations can be implemented in various forms, and it is not to be understood as being limited to the examples described herein. On the contrary, the example implementations are provided to make the descriptions of this application more comprehensive and complete, and comprehensively convey the idea of the example implementations to a person skilled in the art. The accompanying drawings are merely example illustrations of this application and are not necessarily drawn to scale. The same reference numbers in the accompanying drawings represent the same or similar parts, and therefore, repeated descriptions thereof are omitted.

In addition, the described features, structures, or characteristics may be combined in one or more example implementations in any appropriate manner. In the following description, many embodiments are provided to give a full understanding of the example implementations of this application. However, a person skilled in the art is to be aware that, the technical solutions in this application may be implemented without one or more of the particular details, or another method, unit, or step may be used. In other cases, well-known structures, methods, implementations, or operations are not shown or described in detail, in order not to obscure the aspects of this application.

Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An example system architecture of a blockchain network to which the embodiments of this application are applicable is first described below with reference to FIG. 1A and FIG. 1B.

The blockchain network refers to a node network including all nodes recording and querying for data blocks on a blockchain. Each node in the blockchain network is a blockchain node, which is a device which can record and query for data blocks on the blockchain, and may be a terminal in various forms such as a mobile phone, a desktop computer, a notebook computer, a PDA, and an in-vehicle terminal. The blockchain network is divided into a service node subnetwork 101 and an accounting node subnetwork 102. A node in the service node subnetwork 101 is referred to as a service node 103. A node in the accounting node subnetwork 102 is referred to as an accounting node 104.

In addition, the accounting node 104 can directly chain a data block or query for a data block on a blockchain. However, the service node 103 can neither directly chain a data block, nor directly query for a data block on a blockchain, but can request the accounting node 104 for chaining and querying for a data block. An example process is as follows: when there is to-be-chained transaction information on the service node 103, the service node 103 may transmit the transaction information to the accounting node 104 in the accounting node subnetwork 102, so that the accounting node 104 chains the transaction information. When the service node 103 needs to query for a data block, the service node 103 may also perform querying through the accounting node 104. In addition, the accounting node 104 is officially set in many cases, and an unofficial terminal can only be used as the service node 103.

A proxy node 105 is located between the service node subnetwork 101 and the accounting node subnetwork 102, and is an intermediary between the service node 103 and the accounting node 104. When there is to-be-chained transaction information on the service node 103, the service node 103 may transmit the transaction information to the accounting node 104 through the proxy node 105 for chaining. When needing to query for a data block, the service node 103 may also query the accounting node 104 through the proxy node 105.

Figure 1B:
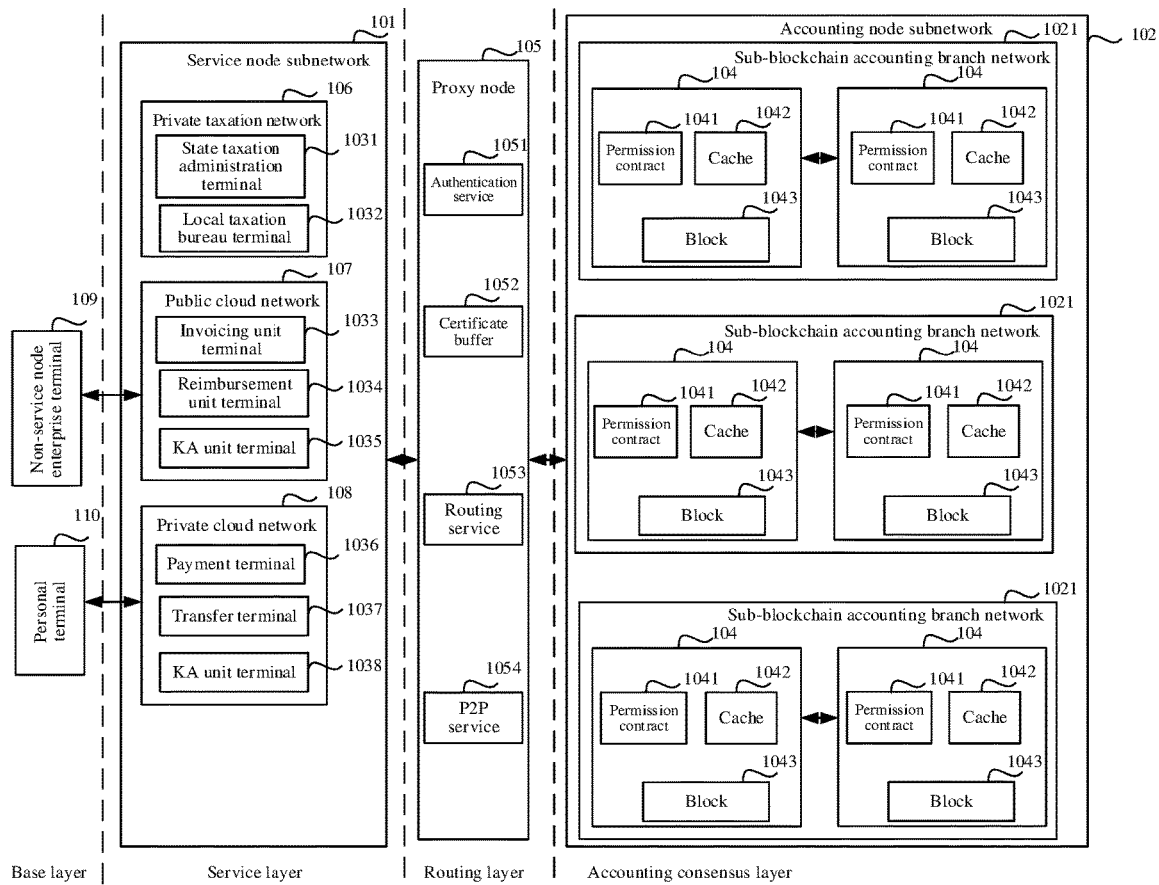
FIG. 1B is a more detailed architecture diagram of the blockchain network in FIG. 1A according to an embodiment of this application.

FIG. 1A merely shows a system structure of a common blockchain network. FIG. 1B shows a more detailed system structure of a taxation blockchain network. The taxation blockchain network refers to a blockchain network for chaining and querying of a transaction related to an electronic invoice (such as receiving, invoicing, and reimbursement). Because the transaction behaviors related to an electronic invoice relate to the governments (taxation bureaus at all tiers), invoicing enterprises (invoicing units and reimbursement units), and individuals (reimbursed persons), the service node subnetwork 101 includes a private taxation network 106, a public cloud network 107, and a private cloud network 108.

The private taxation network 106 is an assembly of all service nodes of governments related to an electronic invoice transaction, including a state taxation administration terminal 1031 and a local taxation bureau terminal 1032. The state taxation administration terminal 1031 may be referred to as a first terminal and the local taxation bureau terminal 1032 may be referred to as a second terminal in various embodiments.

The public cloud network 107 is an assembly of all service nodes of units related to an electronic invoice transaction, including an invoicing unit terminal 1033, a reimbursement unit terminal 1034, and a dedicated (KA) unit terminal 1035. The invoicing unit terminal 1033 and the reimbursement unit terminal 1034 respectively refer to terminals that need to issue or reimburse an electronic invoice and that can also be used as service nodes 103 to request the accounting node 104 to chain or query for a transaction block. Not every terminal that issues or reimburses an electronic invoice can be used as a service node 103 that transmits a request to the accounting node 104. A non-service node enterprise terminal 109 is such a terminal that cannot be used as a service node 103 to transmit such a request to the accounting node 104, and when needing to issue or reimburse an electronic invoice, can only transmit the electronic invoice to the invoicing unit terminal 1033 or the reimbursement unit terminal 1034, which requests the accounting node 104. The dedicated (KA) unit terminal 1035 is a dedicated terminal capable of both issuing an invoice and performing reimbursement set for some large settlement units.

The private cloud network 108 is an assembly of service nodes of individuals related to an electronic invoice transaction, for example, a mobile phone of a reimbursed person, Including a payment terminal 1036, a transfer terminal 1037, a KA unit terminal 1038. The payment terminal 1036 is a terminal that is used by a payer (a reimbursed person) and that can be used as a service node, for example, a mobile phone of the reimbursed person. The transfer terminal 1037 is a terminal that plays a role in implementing a transferring function during a transaction and that can be used as a service node, for example, a mobile phone of a courier (the courier first receives an electronic invoice on behalf of an end user, and then transfers the electronic invoice to a mobile phone terminal of the end user in the form of express delivery). In addition, some other terminals may be used by personal users (such as a payer and a courier) during the transaction, but the terminals are not service nodes 103, and therefore, cannot request the accounting node 104 for chaining, and need to request the payment terminal 1036 or the transfer terminal 1037 used as a service node. The payment terminal 1036 or the transfer terminal 1037 then requests the accounting node 104 for chaining. Such terminals are referred to as personal terminals 110. The KA unit terminal 1038 is a dedicated terminal set for personal settlements of some large settlement units.

A plurality of sub-blockchain accounting branch networks 1021 are set in the accounting node subnetwork 102. Each sub-blockchain accounting branch network 1021 includes a group of accounting nodes 104, separately configured to chain and query for a block of a sub-blockchain. The sub-blockchain refers to that the blockchain is divided into a plurality of subchains, and each subchain performs recording independently, but belongs to the whole blockchain. In this way, when a data block on a blockchain is recorded, a sub-blockchain on which the data block is recorded is first selected, and the data block is recorded by an accounting node 104 in the sub-blockchain accounting branch network 1021 that is responsible for performing recording to the sub-blockchain. Each accounting node 104 includes a permission contract 1041, a cache 1042 required for completing block generation and a consensus, and a recorded block 1043. The proxy node 105 includes modules for an authentication service 1051, a certificate buffer 1052, a routing service 1053, and a P2P service 1054. In other examples, an identity certificate is issued by the proxy node 105.

Figure 2:
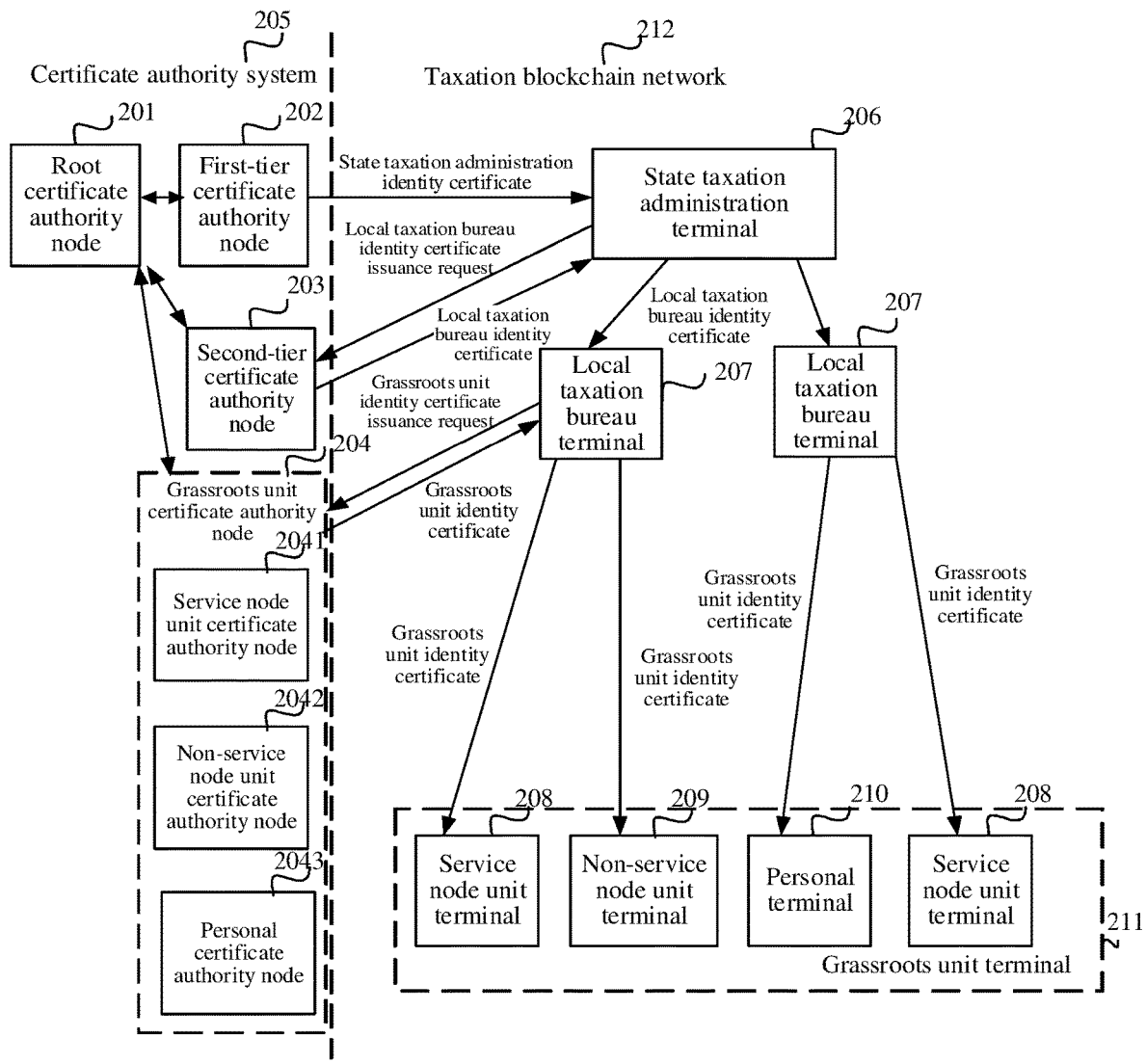
FIG. 2 is a system architecture diagram of a certificate authority system according to an embodiment of this application, the system architecture diagram showing correspondences between certificate authority nodes at all tiers and blockchain nodes at all tiers.

In addition, as shown in FIG. 2, a certificate authority system 205 applied to a taxation blockchain network 212 is set in this embodiment of this application to authorize and issue a certificate. The taxation blockchain network 212 in FIG. 2 includes a state taxation administration terminal 206, a local taxation bureau terminal 207, and a grassroots unit terminal 211. The state taxation administration terminal may be referred to as first terminal, the local taxation bureau terminal may be referred to as second terminal, and the grassroots unit terminal may be referred to as third terminal.

The state taxation administration terminal 206 (i.e. the first terminal) is a terminal used when a state taxation administration conducts a transaction related to an electronic invoice, can be used as a service node 103, and keeps accounts through the accounting node 104 when there is a transaction. For example, a state taxation administration terminal 1031 in FIG. 1B can be also used as an accounting node. For example, an accounting node 104 in FIG. 1B directly chains a block when there is transaction.

The local taxation bureau terminal 207 (i.e. the second terminal) is a terminal used when a local taxation bureau conducts a transaction related to an electronic invoice, can be used as a service node 103, and keeps accounts through the accounting node 104 when there is a transaction. For example, a local taxation bureau terminal 1032 (i.e. the second terminal) in FIG. 1B can be also used as an accounting node. For example, an accounting node 104 in FIG. 1B directly chains a block when there is transaction.

The grassroots unit terminal 211 (i.e. the third terminal) is a terminal used when a grassroots unit conducts a transaction related to an electronic invoice, and includes a service node unit terminal 208, a non-service node unit terminal 209, and a personal terminal 210. The service node unit terminal 208 is a terminal that can be used as a service node 103 to request the accounting node 104 for chaining and querying for a block, for example, the invoicing unit terminal 1033, the reimbursement unit terminal 1034, the KA unit terminal 1035, the payment terminal 1036, the transfer terminal 1037, or the KA unit terminal 1038 in FIG. 1B. The non-service node unit terminal 209 is a unit terminal, for example, a non-service node enterprise terminal 109 in FIG. 1B, that requests, through the service node 103, the accounting node 104 for chaining and querying for a block, and that cannot perform chaining and querying itself. The personal terminal 110 is a personal terminal, for example, the personal terminal 110 in FIG. 1B, that requests, through the service node 103, the accounting node 104 for chaining and querying for a block, and that cannot perform chaining and querying itself.

The certificate authority system 205 in FIG. 2 includes a root certificate authority node 201, a first-tier certificate authority node 202, a second-tier certificate authority node 203, and a grassroots unit certificate authority node 204. The grassroots unit certificate authority node 204 may also be referred to as a third-tier certificate authority node and includes a service node unit certificate authority node 2041, a non-service node unit certificate authority node 2042, and a personal certificate authority node 2043.

The root certificate authority node 201 is a node that generates a root certificate and that generates the first-tier certificate authority node 202, the second-tier certificate authority node 203, and the grassroots unit certificate authority node 204 (i.e. the third-tier certificate authority node) based on the root certificate, and usually is only used during initiation.

The first-tier certificate authority node 202 is a node that issues a state taxation administration identity certificate to the state taxation administration terminal 206. The state taxation administration identity certificate may be referred to as a first identity certificate issued to the first terminal. Generally, a batch of state taxation administration identity certificates are issued to the state taxation administration terminal 206 in advance. Then, the first-tier certificate authority node 202 is also no longer used.

The second-tier certificate authority node 203 is a node that issues a local taxation bureau identity certificate to the local taxation bureau terminal 207. The local taxation bureau identity certificate may be referred to as a second identity certificate issued to the second terminal. The second-tier certificate authority node 203 does not directly issue a local taxation bureau identity certificate to the local taxation bureau terminal 207, but requests issuance through the state taxation administration terminal 206. Because the state taxation administration identity certificate is issued to the state taxation administration terminal 206 in advance, the state taxation administration terminal 206 may request, by using the state taxation administration identity certificates, for issuing a local taxation bureau identity certificate to a subordinate local taxation bureau, thereby ensuring the security of the issuance of the local taxation bureau identity certificate. The local taxation bureau identity certificate is issued to the state taxation administration terminal 206 first and then is transferred to the local taxation bureau terminal 207 by the state taxation administration terminal 206.

The service node unit certificate authority node 2041 is a node that issues a service node unit identity certificate to the service node unit terminal 208. The non-service node unit certificate authority node 2042 is a node that issues a non-service node unit identity certificate to the non-service node unit terminal 209. The personal certificate authority node 2043 is a node that issues a personal identity certificate to the personal terminal 210. The service node unit certificate authority node 2041, the non-service node unit certificate authority node 2042, and the personal certificate authority node 2043 are collectively referred to as the grassroots unit certificate authority node 204 (or the third-tier certificate authority node) that issues a grassroots unit identity certificate to the grassroots unit terminal 211. The grassroots unit identity certificate may be referred to as a third identity certificate, which is issued to the third terminal.

The grassroots unit certificate authority node 204 does not directly issue a grassroots unit identity certificate to the grassroots unit terminal 211, but requests issuance through the local taxation bureau terminal 207. The grassroots unit certificate authority node 204 may be referred to as a third-tier certificate authority node 204. Because the local taxation bureau identity certificate is issued to the local taxation bureau terminal 207 in advance, the local taxation bureau terminal 207 may request, by using the local taxation bureau identity certificate, for issuing a grassroots unit identity certificate to a subordinate grassroots unit, thereby ensuring the security of the issuance of the grassroots unit identity certificate. The grassroots unit identity certificate is issued to the local taxation bureau terminal 207 first and then is transferred to the grassroots unit terminal 211 by the local taxation bureau terminal 207.

With reference to interface diagrams of FIG. 3A to FIG. 3K, the following describes a rough process of issuing an identity certificate to each blockchain node in an application scenario of a blockchain network used for an electronic invoice.

To make local taxation bureau and grassroots unit terminals (i.e. second and third terminals) have a basis for requesting identity certificates, a batch of state taxation administration identity certificates may be issued to the state taxation administration terminal 206 through the first-tier certificate authority node 202 in advance. In this case, a prompt interface shown in FIG. 3A appears on an interface of the state taxation administration terminal 206. Detailed information of the issued state taxation administration identity certificate is displayed on the prompt interface.

Figure 3A:
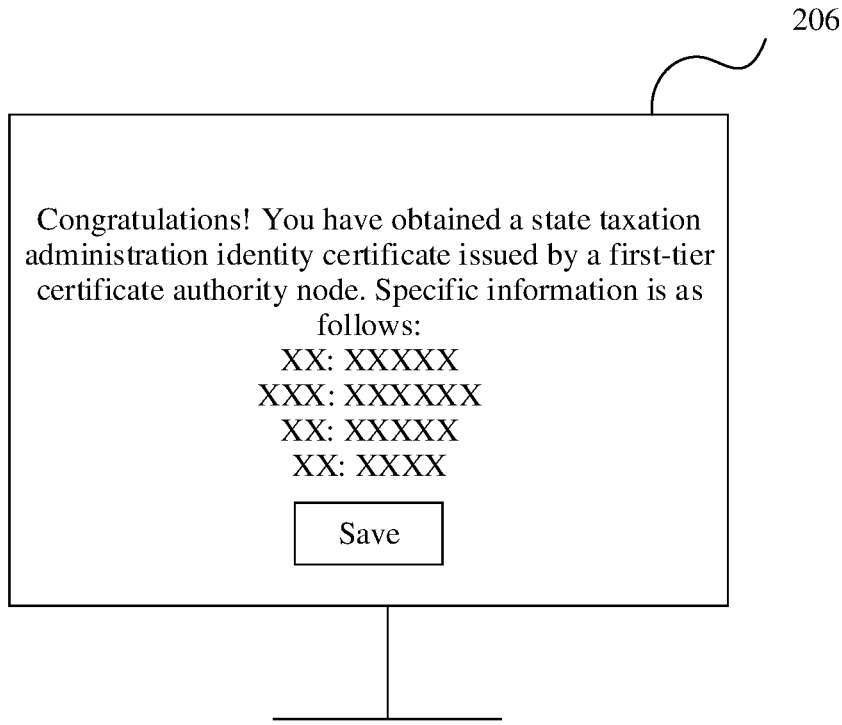
FIG. 3A-K are schematic interface diagrams of application scenarios of issuing identity certificates to blockchain nodes at all tiers in an electronic invoice blockchain network to which a method for issuing an identity certificate to a blockchain node in a taxation blockchain network is applicable according to an embodiment of this application.
Figure 3B:
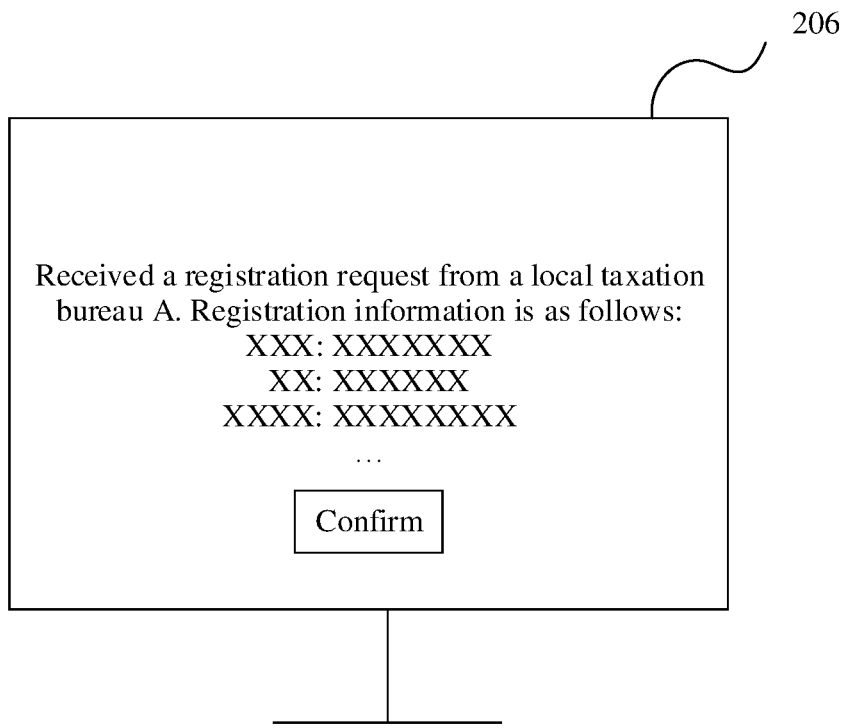
Figure 3C:
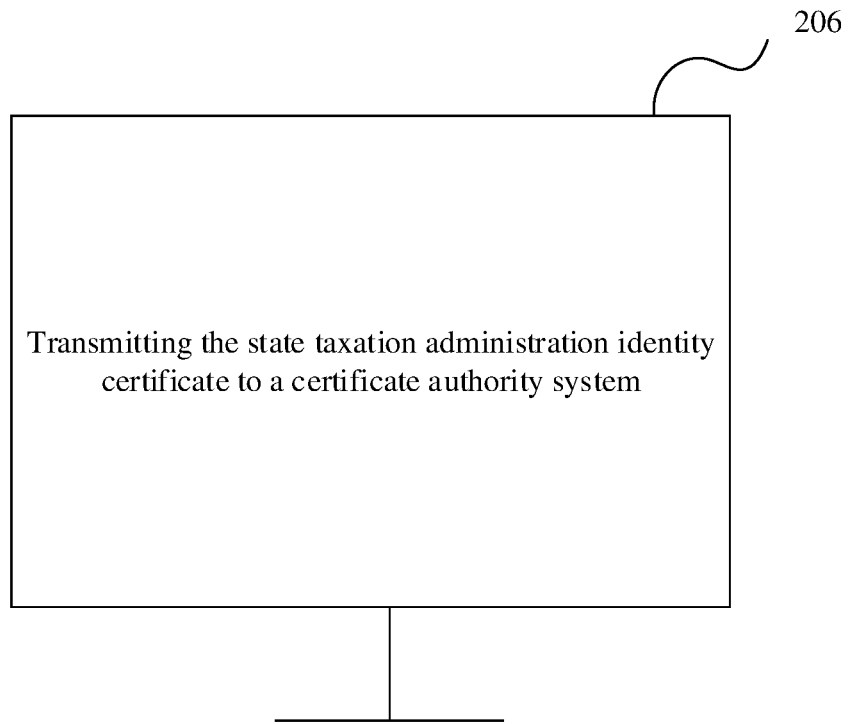
Figure 3D:
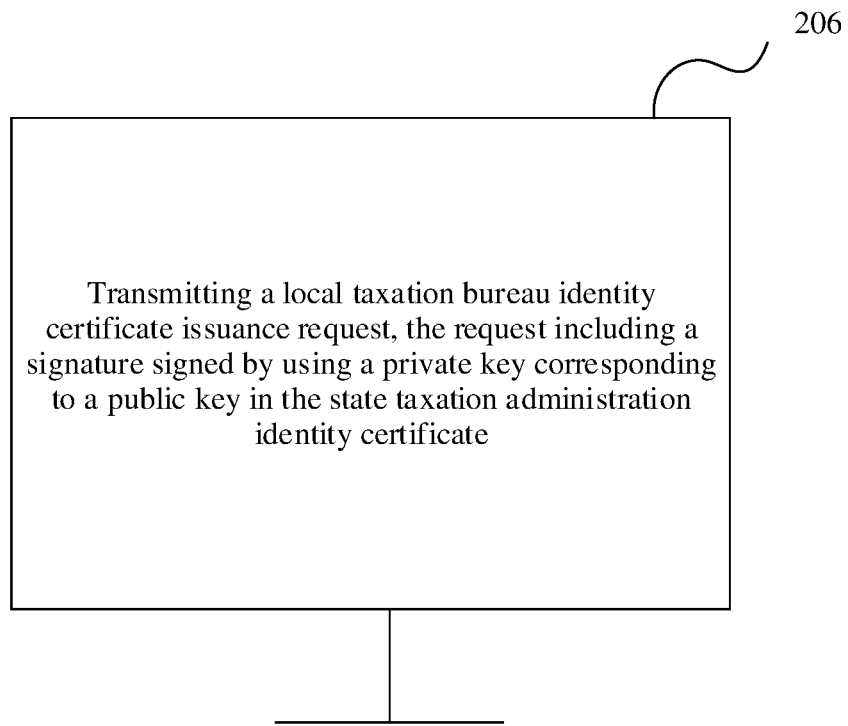
Figure 3E:
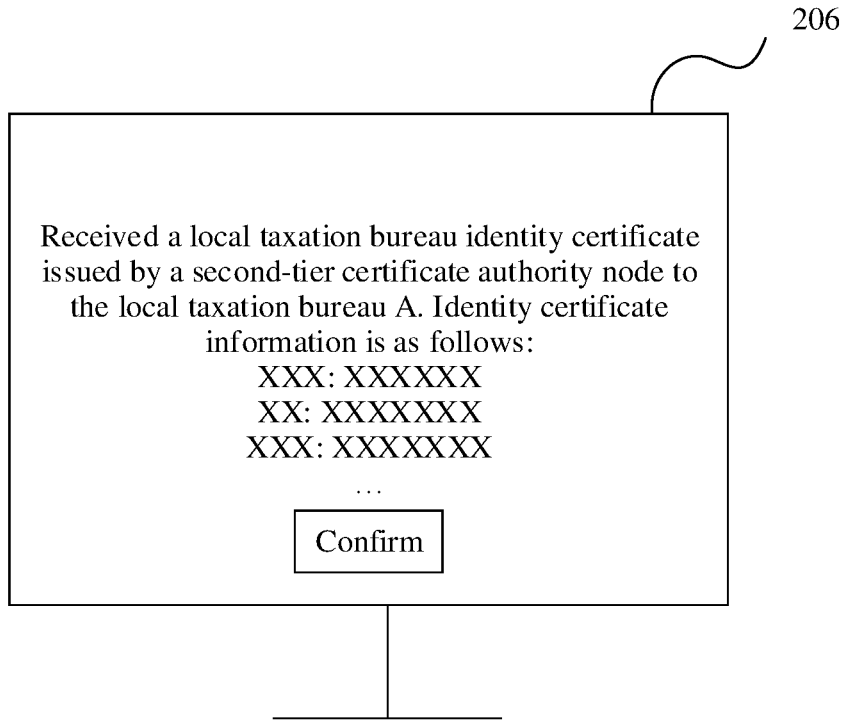
Figure 3F:
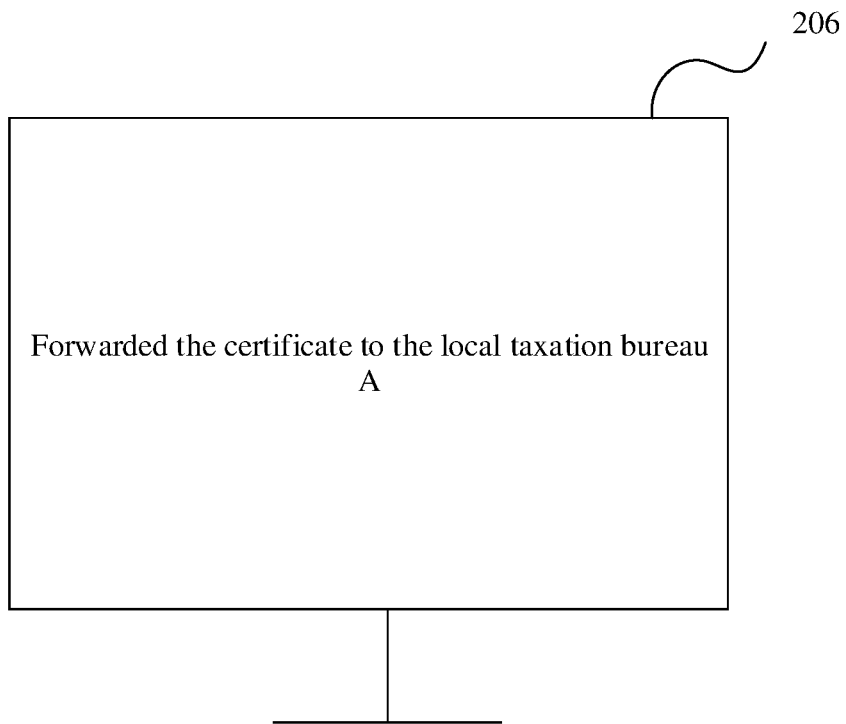

When the local taxation bureau terminal 207 wants to obtain a local taxation bureau identity certificate, the local taxation bureau terminal 207 first transmits a registration request to the state taxation administration terminal 206 that already obtains the state taxation administration identity certificate. In this case, as shown in FIG. 3B, detailed information of the registration request is displayed on the interface of the state taxation administration terminal 206. Next, the state taxation administration terminal 206 requests a local taxation bureau identity certificate for the local taxation bureau terminal 207 by using the state taxation administration identity certificate. An example process is that the state taxation administration terminal 206 transmits the obtained state taxation administration identity certificate back to the certificate authority system 205, as shown in FIG. 3C. Besides, the state taxation administration terminal 206 transmits a local taxation bureau identity certificate issuance request to the certificate authority system 205. The local taxation bureau identity certificate issuance request includes a signature signed by using a private key corresponding to a public key in the state taxation administration identity certificate, as shown in 3D. Then, after verifying the signature successfully, the second-tier certificate authority node 203 transmits the local taxation bureau identity certificate issued to the local taxation bureau terminal 207 to the state taxation administration terminal 206. In this case, as shown in FIG. 3E, detailed information of the local taxation bureau identity certificate is displayed on the interface of the state taxation administration terminal 206, so that the state taxation administration terminal 206 forwards the local taxation bureau identity certificate to the local taxation bureau terminal 207, as shown in FIG. 3F.

Figure 3G:
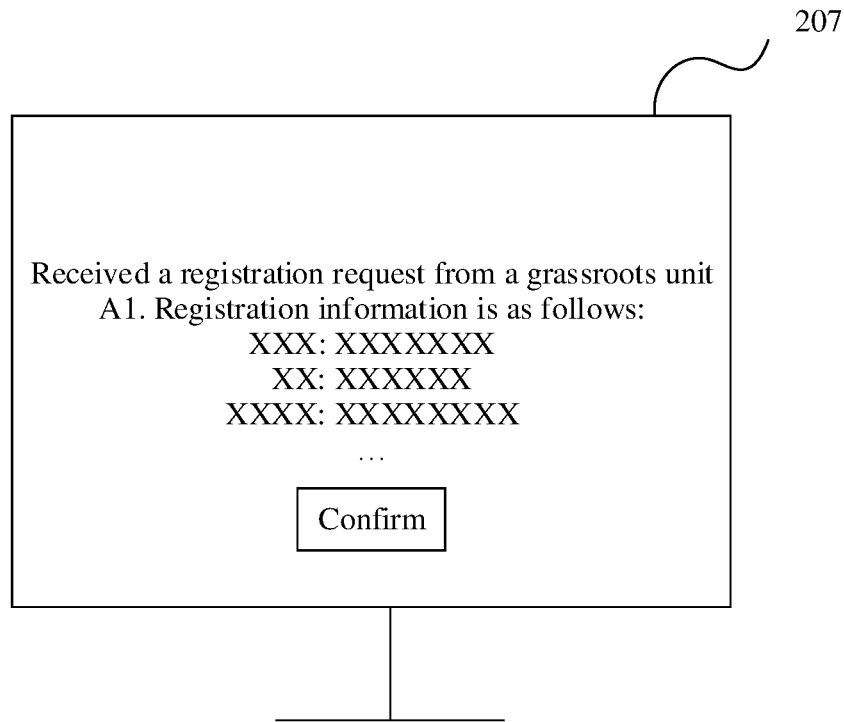
Figure 3H:
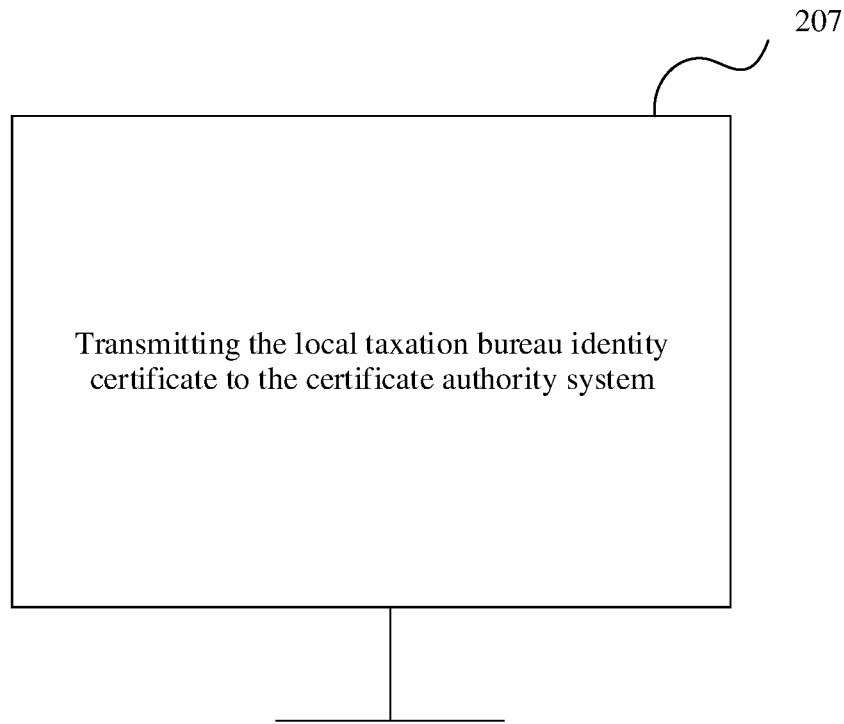
Figure 3I:
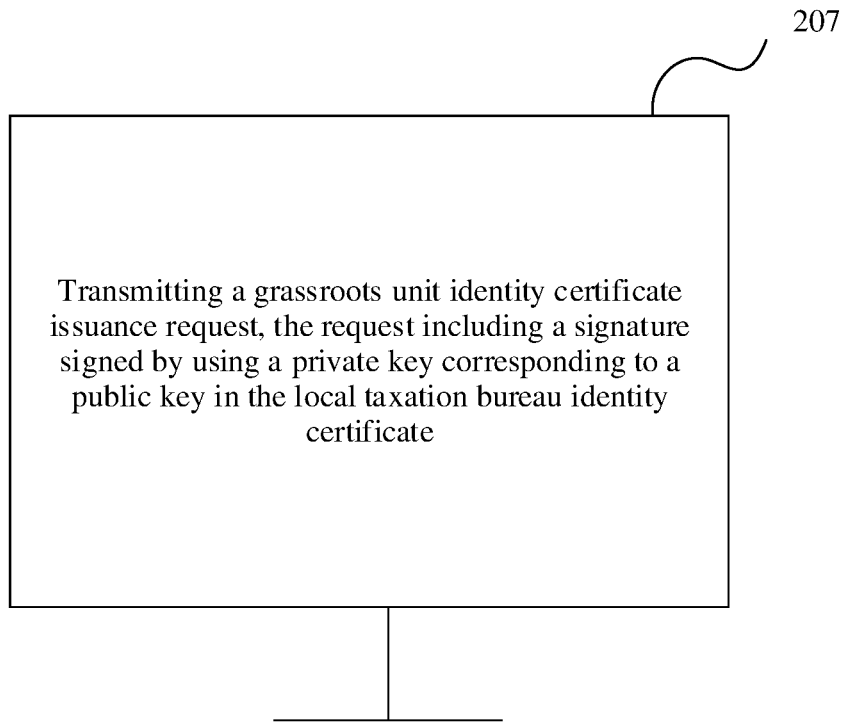
Figure 3J:
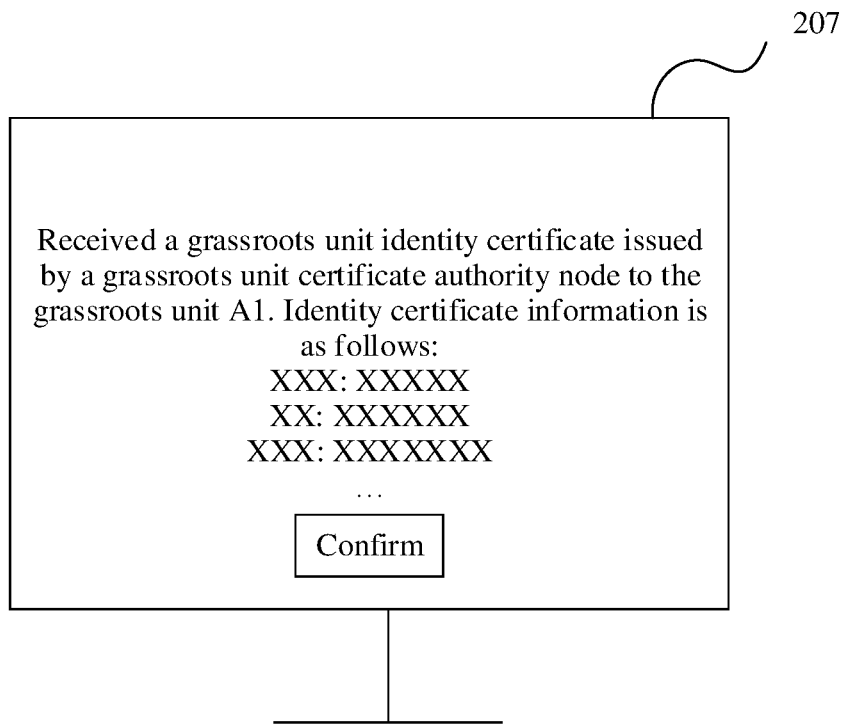
Figure 3K:
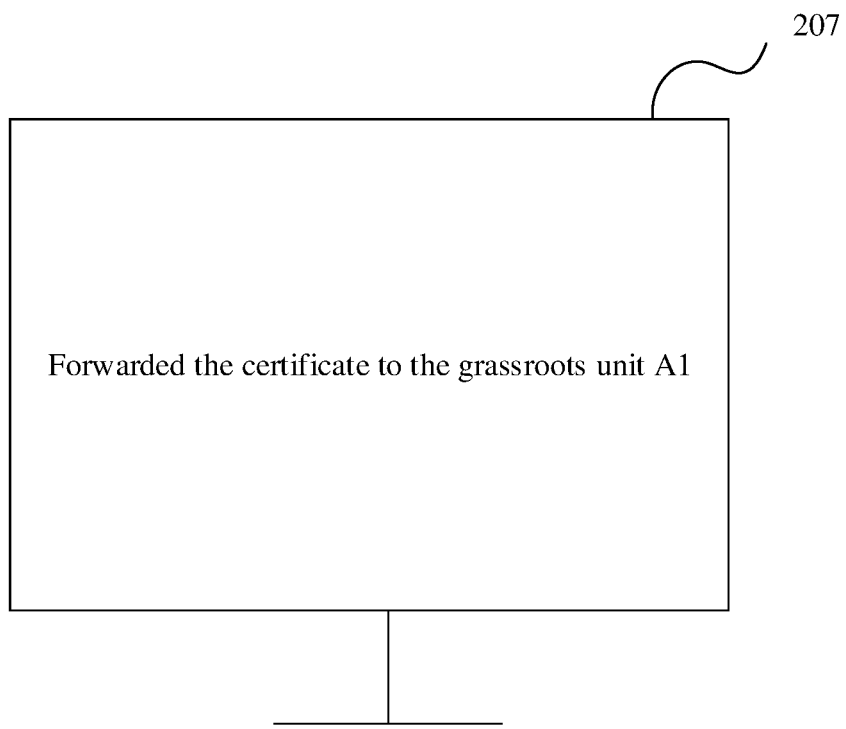

When the grassroots unit terminal 211 wants to obtain a grassroots unit identity certificate, the grassroots unit terminal 211 first transmits a registration request to the local taxation bureau terminal 207 that already obtains the local taxation bureau identity certificate. In this case, as shown in FIG. 3G, detailed information of the registration request is displayed on the interface of the local taxation bureau terminal 207. Next, the local taxation bureau terminal 207 requests a grassroots unit identity certificate for the grassroots unit terminal 211 by using the local taxation bureau identity certificate. An example process is that the local taxation bureau terminal 207 transmits the obtained local taxation bureau identity certificate back to the certificate authority system 205, as shown in FIG. 3H. Besides, the local taxation bureau terminal 207 transmits a grassroots unit identity certificate issuance request to the certificate authority system 205. The grassroots unit identity certificate issuance request includes a signature signed by using a private key corresponding to a public key in the local taxation bureau identity certificate, as shown in 31. Then, after verifying the signature successfully, the grassroots unit certificate authority node 204 transmits the grassroots unit identity certificate issued to the grassroots unit terminal 211 to the local taxation bureau terminal 207. In this case, as shown in FIG. 3J, detailed information of the grassroots unit identity certificate is displayed on the interface of the local taxation bureau terminal 207, so that the local taxation bureau terminal 207 forwards the grassroots unit identity certificate to the grassroots unit terminal 211, as shown in FIG. 3K.

Figure 5:
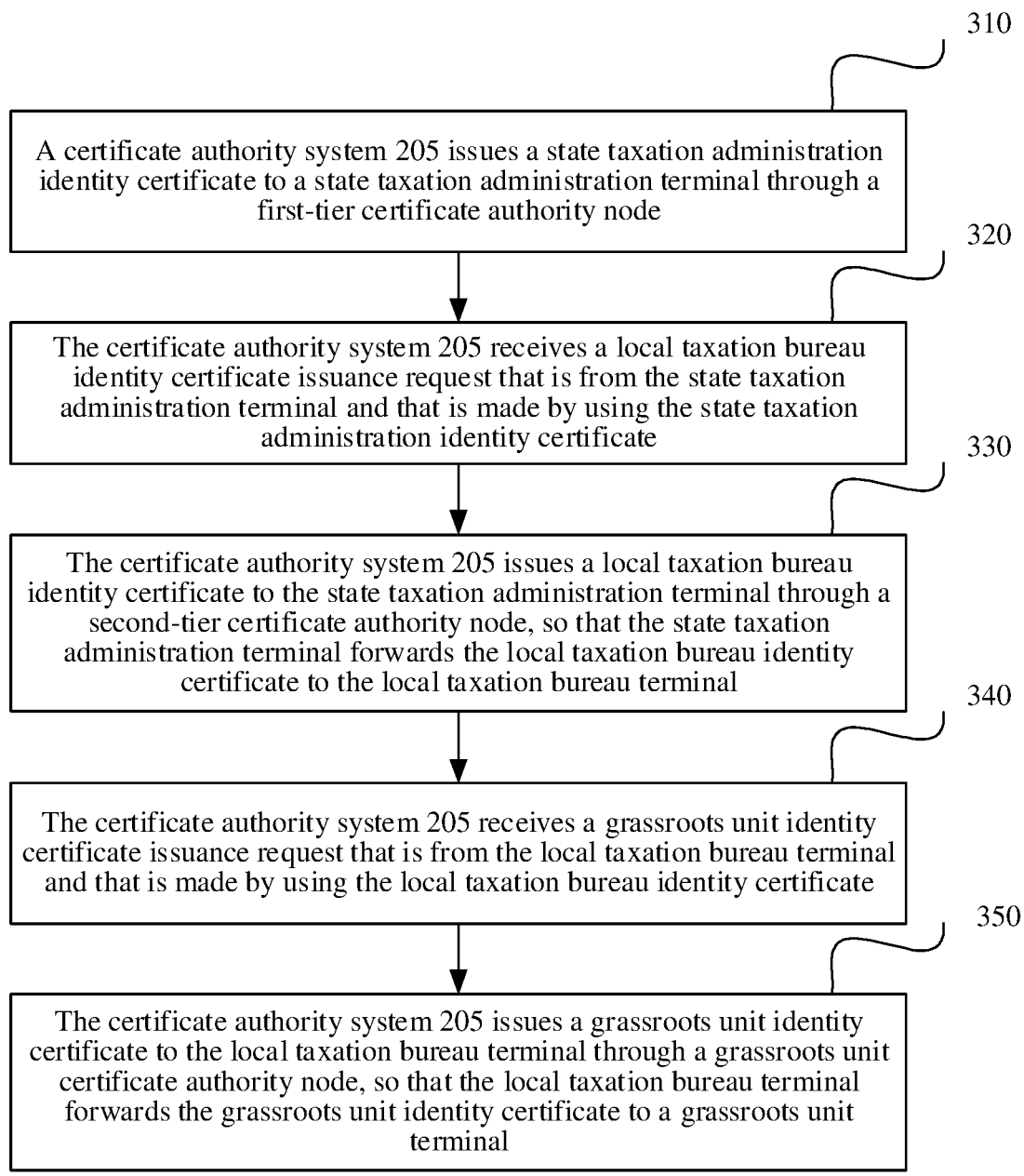
FIG. 5 is a flowchart of a method for issuing an identity certificate to a blockchain node in a taxation blockchain network according to an embodiment of this application.

FIG. 5 is a flowchart of a method for issuing an identity certificate to a blockchain node in a taxation blockchain network according to an embodiment of this application. The method is performed by the certificate authority system 205. As shown in FIG. 5, the method includes the following steps:

Step 310: The certificate authority system 205 issues a state taxation administration identity certificate to a state taxation administration terminal through a first-tier certificate authority node.

Step 320: The certificate authority system 205 receives a local taxation bureau identity certificate issuance request that is from the state taxation administration terminal and that is made by using the state taxation administration identity certificate, the local taxation bureau identity certificate issuance request being generated in response to a registration request transmitted by the local taxation bureau terminal to the state taxation administration terminal.

Step 330: The certificate authority system 205 issues a local taxation bureau identity certificate to the state taxation administration terminal through a second-tier certificate authority node, so that the state taxation administration terminal forwards the local taxation bureau identity certificate to the local taxation bureau terminal.

Step 340: The certificate authority system 205 receives a grassroots unit identity certificate issuance request that is from the local taxation bureau terminal and that is made by using the local taxation bureau identity certificate, the grassroots unit identity certificate issuance request being generated in response to a registration request transmitted by the grassroots unit terminal to the local taxation bureau terminal having the local taxation bureau identity certificate.

Step 350: The certificate authority system 205 issues a grassroots unit identity certificate to the local taxation bureau terminal through a grassroots unit certificate authority node, so that the local taxation bureau terminal forwards the grassroots unit identity certificate to the grassroots unit terminal.

Figure 6:
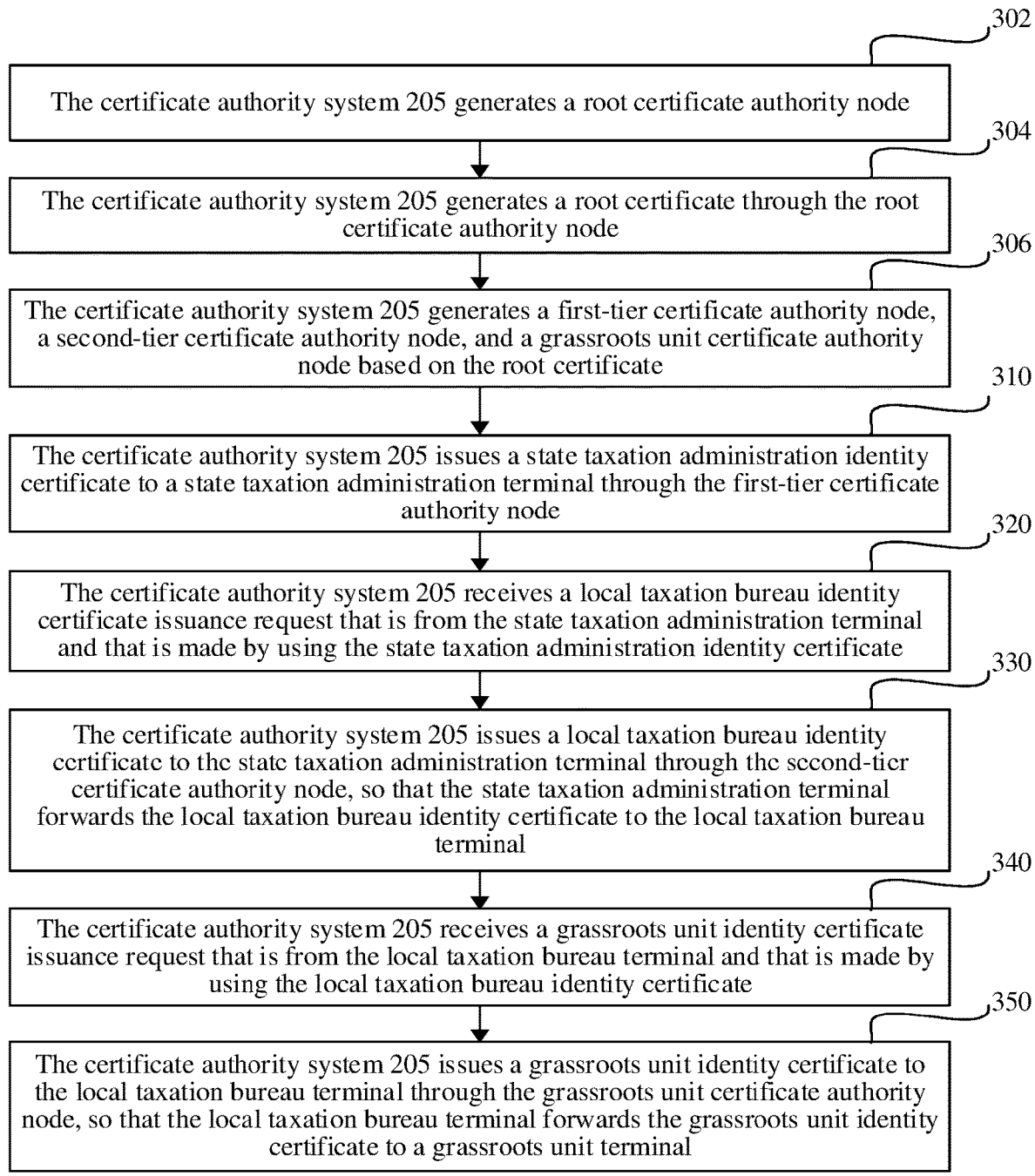
FIG. 6 is a flowchart of a method for issuing an identity certificate to a blockchain node in a taxation blockchain network according to an embodiment of this application.

Before steps 310-350 are described in detail, preparation steps 302-306 of the method performed before step 310 are described with reference to FIG. 6. As shown in FIG. 6, before step 310, in an embodiment, the method includes the following preparation steps:

Step 302: The certificate authority system 205 generates a root certificate authority node.

Step 304: The certificate authority system 205 generates a root certificate through the root certificate authority node.

Step 306: The certificate authority system 205 generates the first-tier certificate authority node, the second-tier certificate authority node, and the grassroots unit certificate authority node based on the root certificate.

The root certificate authority node is a node that initializes and authorizes all other certificate authority nodes in the certificate authority system 205 in a unified manner. In other words, all nodes in the certificate authority system 205 are not generated simultaneously. An initial root certificate authority node is generated first. The root certificate authority node is credible. Then the credibility of other subsequent nodes is ensured by certificates. The root certificate is a certificate issued by the root certificate authority node and used for ensuring the legitimacy of the subsequent authority nodes. The root certificate includes a root public key and a root private key generated at the same time as the root public key.

In an embodiment, step 306 may include the following process performed by the root certificate authority node:

The certificate authority system 205 generates an empty node of the first-tier certificate authority node, an empty node of the second-tier certificate authority node, and an empty node of the grassroots unit certificate authority node (i.e. the third-tier certificate authority node).

The certificate authority system 205 issues the root certificate and the root private key to the empty node of the first-tier certificate authority node, the empty node of the second-tier certificate authority node, and the empty node of the grassroots unit certificate authority node.

The certificate authority system 205 receives a first-tier certificate authority node certificate issuance request, a second-tier certificate authority node certificate issuance request, or a grassroots unit certificate authority node certificate issuance request made by the empty node of the first-tier certificate authority node, the empty node of the second-tier certificate authority node, or the empty node of the grassroots unit certificate authority node by using the root certificate, the issuance request including a signature signed by using the root private key.

If the signature is successfully verified by using the root public key in the root certificate, the certificate authority system 205 generates a public key and a private key of the first-tier certificate authority node, the second-tier certificate authority node, or the grassroots unit certificate authority node for the empty node of the first-tier certificate authority node, the empty node of the second-tier certificate authority node, or the empty node of the grassroots unit certificate authority node, and puts the public key into a first-tier certificate authority node certificate, a second-tier certificate authority node certificate, or a grassroots unit certificate authority node certificate.

The certificate authority system 205 issues the first-tier certificate authority node certificate, the second-tier certificate authority node certificate, or the grassroots unit certificate authority node certificate together with the private key of the first-tier certificate authority node, the private key of the second-tier certificate authority node, or the private key of the grassroots unit certificate authority node to the empty node of the first-tier certificate authority node, the empty node of the second-tier certificate authority node, or the empty node of the grassroots unit certificate authority node.

The empty node refers to a node that includes a hardware carrier for a node, but does not include a corresponding task, and therefore, cannot work normally. The empty node of the first-tier certificate authority node, the empty node of the second-tier certificate authority node, and the empty node of the grassroots unit certificate authority node means that the nodes merely include a physical carrier, and because no certificate is issued thereto, the nodes do not have corresponding permissions to issue the state taxation administration identity certificate, the local taxation bureau identity certificate, and the grassroots unit identity certificate.

After the empty node of the first-tier certificate authority node, the empty node of the second-tier certificate authority node, and the empty node of the grassroots unit certificate authority node are generated, the root certificate and the root private key are issued to the empty nodes. The root certificate includes the root public key. The root public key corresponds to the root private key. The root certificate indicates that the first-tier certificate authority node, the second-tier certificate authority node, and the grassroots unit certificate authority node have permissions to request certificates thereof. After receiving the root certificate and the root private key, the empty node of the first-tier certificate authority node, the empty node of the second-tier certificate authority node, and the empty node of the grassroots unit certificate authority node may transmit the root certificate to the root authority node when needing to request the certificates thereof. Then the empty node of the first-tier certificate authority node, the empty node of the second-tier certificate authority node, or the empty node of the grassroots unit certificate authority node transmits the first-tier certificate authority node certificate issuance request, the second-tier certificate authority node certificate issuance request, or the grassroots unit certificate authority node certificate issuance request to the root authority node, the issuance request including the signature signed by using the root private key. The root authority node performs verification on the signature by using the public key in the root certificate received in advance. If the authentication succeeds, indicating that the empty nodes are empty nodes that receive the root certificate authorized by the empty nodes, certificates of the first-tier certificate authority node, the second-tier certificate authority node, and the grassroots unit certificate authority node can be issued to the empty nodes.

Because the essence of the certificate issuance is to issue a pair of public and private keys, and ensure the legitimacy of the public and private keys in the form of a certificate, a node obtaining a certificate can communicate with another node by using the public and private keys. Therefore, the root authority node first generates the public key and the private key of the first-tier certificate authority node, the public key and the private key of the second-tier certificate authority node, or the public key and the private key of the grassroots unit certificate authority node for the empty node of the first-tier certificate authority node, the empty node of the second-tier certificate authority node, or the empty node of the grassroots unit certificate authority node, puts the public key into the first-tier certificate authority node certificate, the second-tier certificate authority node certificate, or the grassroots unit certificate authority node certificate, and issues the first-tier certificate authority node certificate, the second-tier certificate authority node certificate, or the grassroots unit certificate authority node certificate together with the private key of the first-tier certificate authority node, the private key of the second-tier certificate authority node, or the private key of the grassroots unit certificate authority node to the empty node of the first-tier certificate authority node, the empty node of the second-tier certificate authority node, or the empty node of the grassroots unit certificate authority node. In this way, after obtaining the certificate, the empty node is no longer an empty node and has a permission of the first-tier certificate authority node certificate, the second-tier certificate authority node, or the grassroots unit certificate authority node to normally issue an identity certificate. The permission is given by the first-tier certificate authority node certificate, the second-tier certificate authority node certificate, or the grassroots unit certificate authority node certificate.

Advantages of the foregoing embodiments are that the generation of the first-tier certificate authority node, the second-tier certificate authority node, or the grassroots unit certificate authority node also depends on the authorization of the root certificate, so that the legitimacy of permission sources of the authority nodes in the certificate authority system is improved, the permission sources of the authorized nodes have rules to follow, a foundation is laid for the legitimacy of the permission source of the authority node, and the credibility of the authorization of the certificate of the certificate authority system is improved.

In step 310, the certificate authority system 205 issues the state taxation administration identity certificate to the state taxation administration terminal through the first-tier certificate authority node.

Because the essence of the certificate issuing method is to distribute public keys and private keys to blockchain nodes, and prove the legitimacy of the public keys and the private keys, to help the blockchain node to communicate with another blockchain node. Therefore, in an embodiment, step 310 includes the following process performed by the first-tier certificate authority node:

The certificate authority system 205 generates a public key and a private key of the state taxation administration terminal by using the first-tier certificate authority node.

The certificate authority system 205 generates the state taxation administration identity certificate for the state taxation administration terminal, the state taxation administration identity certificate including the public key of the state taxation administration terminal.

The certificate authority system 205 transmits the state taxation administration identity certificate and the private key of the state taxation administration terminal to the state taxation administration terminal.

The first-tier certificate authority node may generate the pair of a public key and a private key by using a preset algorithm of generating a pair of public and private keys. The first-tier certificate authority node may generate the state taxation administration identity certificate by using a preset identity certificate generation method. The first-tier certificate authority node transmits both the state taxation administration identity certificate and the private key of the state taxation administration terminal to the state taxation administration terminal. The function of the private key of the state taxation administration terminal is that the state taxation administration terminal may sign a signature by using the private key when needing to communicate with another blockchain node later. In addition, the signature can be successfully verified by using the public key in the state taxation administration identity certificate.

In step 320, the local taxation bureau identity certificate issuance request that is from the state taxation administration terminal and that is made by using the state taxation administration identity certificate is received, the local taxation bureau identity certificate issuance request being generated in response to a registration request transmitted by the local taxation bureau terminal to the state taxation administration terminal.

In an embodiment, step 320 may include the following process performed by the second-tier certificate authority node:

receiving the state taxation administration identity certificate from the state taxation administration terminal;
receiving the local taxation bureau identity certificate issuance request from the state taxation administration terminal, the local taxation bureau identity certificate issuance request including registration information of the local taxation bureau and a signature signed to the registration information of the local taxation bureau by using the private key of the state taxation administration; and
performing, by using the public key of the state taxation administration in the state taxation administration identity certificate, verification on the signature in the local taxation bureau identity certificate issuance request.

After the state taxation administration terminal obtains the state taxation administration identity certificate, the state taxation administration terminal has a permission to request the local taxation bureau identity certificate on behalf of the subordinate local taxation bureau terminal. If the local taxation bureau wants to obtain the local taxation bureau identity certificate, the local taxation bureau needs to submit a registration request to the state taxation administration terminal. The registration request includes information that needs to be provided for registering with the taxation blockchain network. After receiving the registration request, the state taxation administration terminal transmits the state taxation administration identity certificate to the second-tier certificate authority node. In this way, the second-tier certificate authority node obtains the public key of the state taxation administration terminal in the certificate. The state taxation administration terminal signs a signature to the registration information of the local taxation bureau by using the private key of the state taxation administration, puts the signature together with the registration information into the local taxation bureau identity certificate issuance request, and transmits the request to the second-tier certificate authority node. The second-tier certificate authority node may perform verification on the signature in the local taxation bureau identity certificate issuance request by using the public key of the state taxation administration in the state taxation administration identity certificate. After the verification succeeds, the local taxation bureau identity certificate is issued to the local taxation bureau terminal.

An advantage of the foregoing process is that the manner of encrypting the registration information by using the private key of the state taxation administration terminal and performing verification by using the public key in the state taxation administration identity certificate ensures that a legitimate state taxation administration terminal requests issuance of the local taxation bureau identity certificate for the subordinate local taxation bureau terminal, thereby improving the security of the issue of the local taxation bureau identity certificate.

In step 330, the certificate authority system 205 issues the local taxation bureau identity certificate to the state taxation administration terminal through the second-tier certificate authority node, so that the state taxation administration terminal forwards the local taxation bureau identity certificate to the local taxation bureau terminal.

Because the essence of the identity certificate issuance is a process of issuing public and private keys and proving the legitimacy of the public and private keys by using a certificate, in an embodiment, step 330 may include the following process performed by the second-tier certificate authority node:

The certificate authority system 205 performs authentication on the registration information by using the second-tier certificate authority node.

The certificate authority system 205 generates a public key and a private key of the local taxation bureau terminal for the local taxation bureau terminal if the authentication succeeds.

The certificate authority system 205 generates the local taxation bureau identity certificate for the local taxation bureau terminal, the local taxation bureau identity certificate including the public key of the local taxation bureau terminal.

The certificate authority system 205 transmits the local taxation bureau identity certificate and the private key of the local taxation bureau terminal to the state taxation administration terminal, so that the state taxation administration terminal forwards the local taxation bureau identity certificate and the private key of the local taxation bureau terminal to the local taxation bureau terminal, the local taxation bureau identity certificate and the private key of the local taxation bureau terminal being used for communication between the local taxation bureau terminal and another blockchain node in the taxation blockchain network.

Performing authentication on the registration information includes checking whether the registration information meets specified legal requirements. A script of checking whether the legal requirements are meet may be edited in advance according to the specified legal requirements. Authentication can be implemented by executing the script during the authentication.

The process of generating and issuing the public key and the private key of the local taxation bureau terminal and the local taxation bureau identity certificate is similar to that of generating and issuing the public key and the private key of the state taxation administration terminal and the state taxation administration identity certificate.

The foregoing manner of generating the public key and the private key and the local taxation bureau identity certificate, and issuing both the local taxation bureau identity certificate and the private key guarantees the authentication on the identity of the local taxation bureau terminal during subsequent communication with another blockchain node, thereby improving the security of the communication between the local taxation bureau terminal and another blockchain node.

Specifically, in an embodiment, the communication between the local taxation bureau terminal and another blockchain node in the taxation blockchain network includes the following process performed by the local taxation bureau terminal:

transmitting, by the local taxation bureau terminal, the local taxation bureau identity certificate to the another blockchain node;

signing, by the local taxation bureau terminal by using the private key of the local taxation bureau terminal, a signature to content to be transmitted to the another blockchain node; and transmitting, by the local taxation bureau terminal, the content and the signature to the another blockchain node together, so that the another blockchain node performs verification on the signature by using the public key in the local taxation bureau identity certificate.

The another blockchain node refers to any node other than the local taxation bureau terminal in the blockchain network. In a scenario in which the local taxation bureau terminal chains transaction information of an electronic invoice issued by an enterprise, the local taxation bureau terminal transmits the transaction information to the accounting node through the proxy node for chaining. The another blockchain node herein refers to a proxy node. The content to be transmitted to the another blockchain node is the transaction information. In a scenario in which the local taxation bureau terminal transmits a request for querying for statistical data to the state taxation administration terminal, the another blockchain node herein refers to the state taxation administration terminal. The content to be transmitted to the another blockchain node is the request for querying for statistical data.

The local taxation bureau terminal first transmits the local taxation bureau identity certificate to the another blockchain node, so that the another blockchain node obtains the public key of the local taxation bureau terminal in the certificate. Next, the local taxation bureau terminal signs, by using the private key of the local taxation bureau terminal, a signature to the content to be transmitted to the another blockchain node, and transmits both the content and the signature to the another blockchain node. In this case, the another blockchain node can perform verification on the signature by using the public key in the local taxation bureau identity certificate. The manner ensures that during information transfer between the local taxation bureau terminal and the another blockchain node in the blockchain network, identities of the two parties are verifiable, thereby improving the security of the communication in the blockchain network.

In step 340, the certificate authority system 205 receives the grassroots unit identity certificate issuance request that is from the local taxation bureau terminal and that is made by using the local taxation bureau identity certificate, the grassroots unit identity certificate issuance request being generated in response to the registration request transmitted by the grassroots unit terminal to the local taxation bureau terminal having the local taxation bureau identity certificate.

In an embodiment, step 340 may include the following process performed by the grassroots unit certificate authority node:

receiving the local taxation bureau identity certificate from the local taxation bureau terminal;

receiving the grassroots unit identity certificate issuance request from the local taxation bureau terminal, the grassroots unit identity certificate issuance request including registration information of the grassroots unit and a signature signed to the registration information of the grassroots unit by using the private key of the local taxation bureau; and performing verification on the signature in the grassroots unit identity certificate issuance request by using the public key of the local taxation bureau in the local taxation bureau identity certificate.

The implementation and the advantages of the foregoing process are respectively similar to the implementation and the advantages of step 320. In some embodiments, the grassroots unit identity certificate issuance request is from the local taxation bureau terminal and is made by using the local taxation bureau identity certificate, rather than the local taxation bureau identity certificate issuance request that is from the state taxation administration terminal and that is made by using the state taxation administration identity certificate, is received.

In step 350, the certificate authority system 205 issues the grassroots unit identity certificate to the local taxation bureau terminal through the grassroots unit certificate authority node, so that the local taxation bureau terminal forwards the grassroots unit identity certificate to the grassroots unit terminal.

In an embodiment, step 350 may include the following process performed by the grassroots unit certificate authority node:

The certificate authority system 205 performs authentication on the registration information of the grassroots unit by using the grassroots unit certificate authority node.

The certificate authority system 205 generates a public key and a private key of the grassroots unit terminal for the grassroots unit terminal if the authentication succeeds.

The certificate authority system 205 generates the grassroots unit identity certificate for the grassroots unit terminal, the grassroots unit identity certificate including the public key of the grassroots unit terminal.

The certificate authority system 205 transmits the grassroots unit identity certificate and the private key of the grassroots unit terminal to the local taxation bureau terminal, so that the local taxation bureau terminal forwards the grassroots unit identity certificate and the private key of the grassroots unit terminal to the grassroots unit terminal, the grassroots unit identity certificate and the private key of the grassroots unit terminal being used for communication between the grassroots unit terminal and another blockchain node in the taxation blockchain network.

The implementation and the advantages of the process are respectively similar to the implementation and the advantages of step 330, except for that the grassroots unit identity certificate is issued to the local taxation bureau terminal through the grassroots unit certificate authority node for forwarding by the local taxation bureau terminal to the grassroots unit terminal, rather than that the local taxation bureau identity certificate is issued to the state taxation administration terminal through the second-tier certificate authority node for forwarding by the state taxation administration terminal to the local taxation bureau terminal.

In an embodiment, the communication between the grassroots unit terminal and another blockchain node in the taxation blockchain network includes the following steps:

transmitting, by the grassroots unit terminal, the grassroots unit identity certificate to the another blockchain node;

signing, by the grassroots unit terminal by using the private key of the grassroots unit terminal, a signature to content to be transmitted to the another blockchain node; and transmitting, by the grassroots unit terminal, the content and the signature to the another blockchain node together, so that the another blockchain node performs verification on the signature by using the public key in the grassroots unit identity certificate.

The another blockchain node herein denotes different nodes in different communication scenarios. For example, in a scenario in which the grassroots unit is an invoicing unit, and information about an issued electronic invoice needs to be transmitted to the accounting node through the proxy node for chaining, the another blockchain node refers to a proxy node. The content to be transmitted to the another blockchain node refers to the information about the issued electronic invoice. The process and the advantages may be similar to those of the communication between the local taxation bureau terminal and another blockchain node in the taxation blockchain network.

In an embodiment, the grassroots unit identity certificate includes a service node unit identity certificate, a non-service node unit identity certificate, and a personal identity certificate. The "issuing a grassroots unit identity certificate to the local taxation bureau terminal, so that the local taxation bureau terminal forwards the grassroots unit identity certificate to the grassroots unit terminal" in step 350 includes the following steps:

issuing, when the grassroots unit identity certificate issuance request is for a service node unit, the service node unit identity certificate to the local taxation bureau terminal, so that the local taxation bureau terminal forwards the service node unit identity certificate to the service node unit terminal, the service node unit identity certificate being used for communication of chained information between the service node and the proxy node;

issuing, when the grassroots unit identity certificate issuance request is for a non-service node unit, the non-service node unit identity certificate to the local taxation bureau terminal, so that the local taxation bureau terminal forwards the non-service node unit identity certificate to the non-service node unit terminal, the non-service node unit identity certificate being used for transfer of basic information of the chained information between the non-service node unit terminal and the service node unit terminal; and issuing, when the grassroots unit identity certificate issuance request is for an individual, the personal identity certificate to the local taxation bureau terminal, so that the local taxation bureau terminal forwards the personal identity certificate to the personal terminal, the personal identity certificate being used for transfer of the basic information of the chained information between the personal terminal and the service node unit terminal.

If the grassroots unit identity certificate issuance request is generated by the local taxation bureau terminal in response to a registration request of the service node unit terminal, it is considered that the grassroots unit identity certificate issuance request is for the service node unit. If the grassroots unit identity certificate issuance request is generated by the local taxation bureau terminal in response to a registration request of the non-service node unit terminal, it is considered that the grassroots unit identity certificate issuance request is for the non-service node unit. If the grassroots unit identity certificate issuance request is generated by the local taxation bureau terminal in response to a registration request of the personal terminal, it is considered that the grassroots unit identity certificate issuance request is for the individual.

The chained information refers to to-be-chained information that is forwarded by the service node to the accounting node through the proxy node, for example, information about an electronic invoice issued after the local taxation bureau terminal issues the electronic invoice to an enterprise and invoicing information after the service node issues an electronic invoice. Basic information of the chained information refers to information that is not to-be-chained information transmitted by the service node to the proxy node, but information used as a basis of the to-be-chained information. For example, if an enterprise that is not a service node issues an invoice that needs to be chained, but the enterprise is not a service node. The invoicing information can only be used as basic information of chained information and transmitted to a unit that can be used as a service node. The unit generates the chained information and transmits the chained information to the proxy node.

That the service node unit identity certificate is used for communication of chained information between the service node and the proxy node refers to that when transmitting the chained information to the proxy node, the service node first transmits the service node unit identity certificate to the proxy node, so that the proxy node obtains a public key in the certificate; then the service node signs a signature to the chained information by using a private key corresponding to the public key in the service node unit identity certificate, and transmits the signature and the chained information to the proxy node together; after receiving the two, the proxy node performs verification on the signature by using the public key in the certificate; and if the verification succeeds, the chained information can be forwarded to the accounting node for chaining.

The non-service node unit identity certificate being used for transfer of basic information of the chained information between the non-service node unit terminal and the service node unit terminal is similar to the foregoing process, except for that the basic information of the chained information rather than the chained information is transferred, and is transferred between the non-service node unit terminal and the service node unit terminal. The personal identity certificate being used for transfer of the basic information of the chained information between the personal terminal and the service node unit terminal may be similar to embodiments and examples already discussed.

Through the foregoing processes, the identity certificates of the state taxation administration terminal, the local taxation bureau terminal, and the grassroots unit terminal are issued to themselves, so that the state taxation administration terminal, the local taxation bureau terminal, and the grassroots unit terminal can prove the identities thereof to a communication peer during blockchain network communication. However, as a very important part in the blockchain network communication, proxy node communication also needs to be considered, and a corresponding communication certificate is also needed to ensure the security of the communication.

Figure 9:
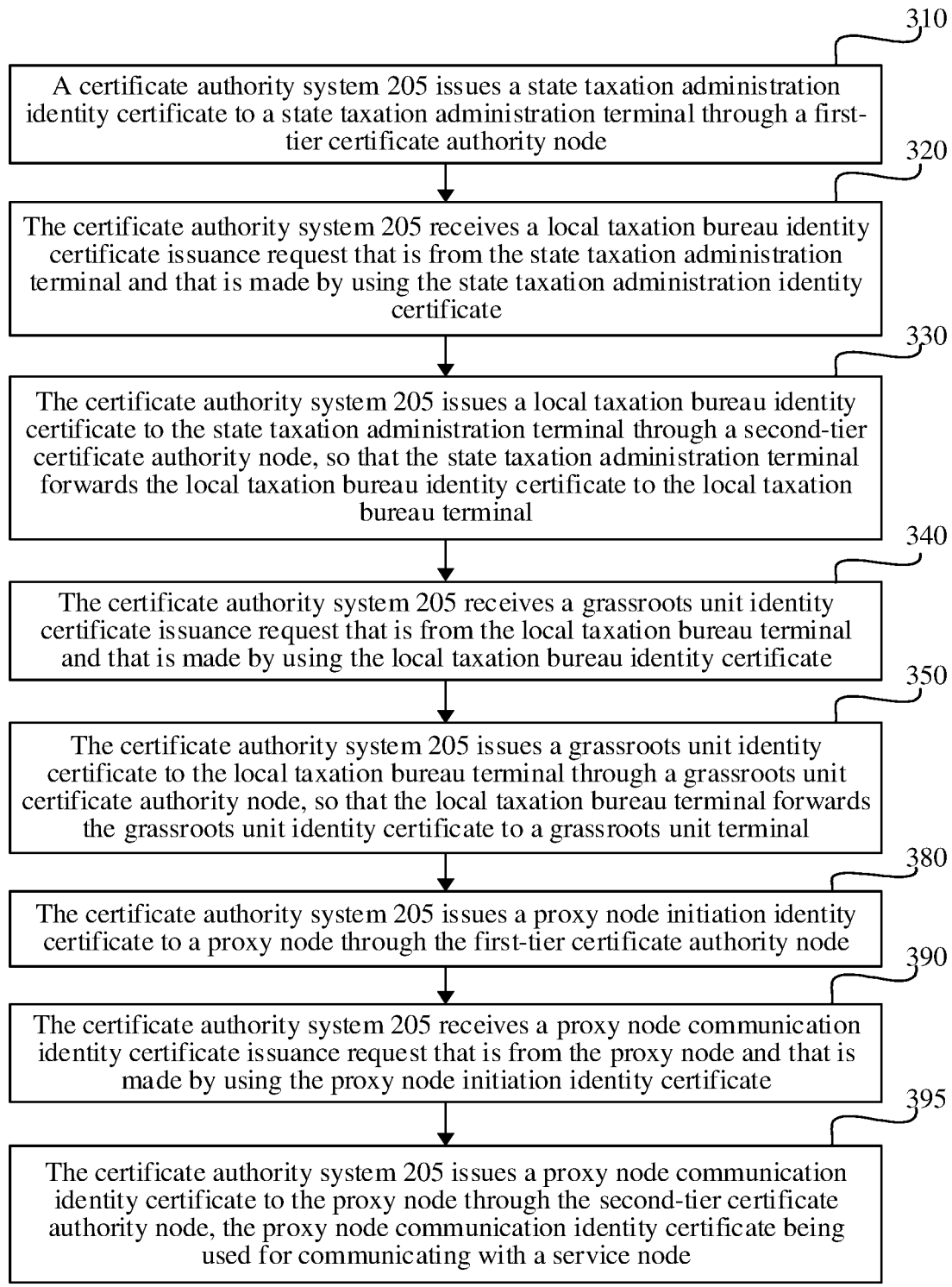
FIG. 9 is a flowchart of a method for issuing an identity certificate to a blockchain node in a taxation blockchain network according to an embodiment of this application.

As shown in FIG. 9, in an embodiment, the method further includes the following steps.

Step 380: The certificate authority system 205 issues a proxy node initiation identity certificate to the proxy node through the first-tier certificate authority node.

Step 390: The certificate authority system 205 receives a proxy node communication identity certificate issuance request that is from the proxy node and that is made by using the proxy node initiation identity certificate.

Step 395: The certificate authority system 205 issues a proxy node communication identity certificate to the proxy node through the second-tier certificate authority node, the proxy node communication identity certificate being used for communicating with the service node.

Although the steps are performed after step 350 as shown in FIG. 9, a person skilled in the art understands that the steps can be performed at any time point in the process of the method because the foregoing process involves issuance of the proxy node communication identity certificate, which is independent of the main process of this application.

The status of the proxy node is relatively special, and there is no upper-tier node that requests an identity certificate for the proxy node. Therefore, the subsequent issuance of the proxy node initiation identity certificate can be ensured only by using a batch of proxy node initiation identity certificates to the proxy node through the first-tier certificate authority node in advance.

The proxy node initiation identity certificate is a certificate indicating that the proxy node obtains a permission to request the proxy node communication identity certificate and internally includes an initiation public key of the proxy node and an initiation private key of the proxy node corresponding to the initiation public key. The initiation public and private keys of the proxy node are used for verifying whether the proxy node has a permission to request public and private keys of the proxy node communication identity certificate.

The proxy node communication identity certificate is a certificate indicating that the proxy node has a permission to communicate with the service node in the blockchain network and internally includes a communication public key of the proxy node and a communication private key of the proxy node corresponding to the communication public key. The communication public and private keys of the proxy node are public and private keys for proving the identity of the proxy node to the service node during communication with the service node in the blockchain network.

In an embodiment, step 380 may include the following process performed by the first-tier certificate authority node:

The certificate authority system 205 generates an initiation public key and an initiation private key of the proxy node by using the first-tier certificate authority node;

The certificate authority system 205 generates the proxy node initiation identity certificate for the proxy node, the proxy node initiation identity certificate including the initiation public key of the proxy node.

The certificate authority system 205 transmits the proxy node initiation identity certificate and the initiation private key of the proxy node to the proxy node.

The process may be similar to the example process of step 310, except for that the proxy node initiation identity certificate rather than the state taxation administration identity certificate issued herein.

In an embodiment, step 390 may include the following process performed by the second-tier certificate authority node:

receiving the proxy node initiation identity certificate from the proxy node;

receiving the proxy node communication identity certificate issuance request from the proxy node, the proxy node communication identity certificate issuance request including registration information of the proxy node and a signature signed to the registration information of the proxy node by using the initiation private key of the proxy node; and performing, by using the initiation public key of the proxy node in the proxy node initiation identity certificate, verification on the signature in the proxy node communication identity certificate issuance request.

The process may be similar to the example process of step 320, except for that the proxy node communication identity certificate issuance request that is from the proxy node and that is made by using the proxy node initiation identity certificate, rather than the local taxation bureau identity certificate issuance request that is from the state taxation administration terminal and that is made by using the state taxation administration identity certificate, is received.

In an embodiment, step 395 may include the following process performed by the second-tier certificate authority node:

The certificate authority system 205 performs authentication on registration information of the proxy node by using the second-tier certificate authority node.

The certificate authority system 205 generates a communication public key and a communication private key of the proxy node for the proxy node when the authentication succeeds.

The certificate authority system 205 generates the proxy node communication identity certificate for the proxy node, the proxy node communication identity certificate including the communication public key of the proxy node.

The certificate authority system 205 transmits the proxy node communication identity certificate and the communication private key of the proxy node to the proxy node, the proxy node communication identity certificate and the communication private key of the proxy node being used for the proxy node to communicate with the service node.

The process may be similar to the example process of step 330, except for that the proxy node communication identity certificate rather than the local taxation bureau identity certificate issued herein.

In an embodiment, the proxy node communicating with the service node includes the following process performed by the proxy node:

The proxy node issues the proxy node communication identity certificate to the service node.

The proxy node signs, node by using the communication private key of the proxy node, a signature to content to be transmitted to the service node.

The proxy node transmits the content and the signature to the service node together, so that the service node performs verification on the signature by using the communication public key in the proxy node communication identity certificate.

The process may be similar to the example process of the local taxation bureau terminal communicating with another blockchain node in the blockchain network.

The following shows a summarized table of information related to identity certificates:

TABLE 1

List of information related to identity certificates:

| Certificate name | Permission level | Creation time | Identity certificate required for signing and issuing the certificate | Whether for communication or not | Whether for communication of an invoice service in a blockchain network or not | Corresponding system role |
| --- | --- | --- | --- | --- | --- | --- |
| Root certificate | Level 4 (highest) | Initialization of compilation | Not directly sign and issue | No | No | IT operation and maintenance of state taxation administration |
| State taxation administration identity certificate | Level 3 | Initialization of compilation | Not directly sign and issue | Yes (for communication of requesting issuance of a local taxation bureau identity certificate) | No | State taxation administration |
| Local taxation bureau identity certificate | Level 2 | In response to a request | State taxation administration identity certificate | Yes (for communication of requesting issuance of a grassroots unit identity certificate) | No | Local taxation bureau |
| Service node unit identity certificate | Level 1 | In response to a request | Local taxation bureau identity certificate | Yes | Yes | Service node |
| Non-service node unit identity certificate | Level 1 | In response to a request | Local taxation bureau identity certificate | No | No | Non-service node |
| Personal identity certificate | Level 1 | In response to a request | Local taxation bureau identity certificate | No | No | Individual |

In addition, the state taxation administration terminal has the highest permission, and not only can issue a local taxation bureau identity certificate to the local taxation bureau terminal and but also can request a grassroots unit identity certificate for the grassroots unit terminal.

Figure 7:
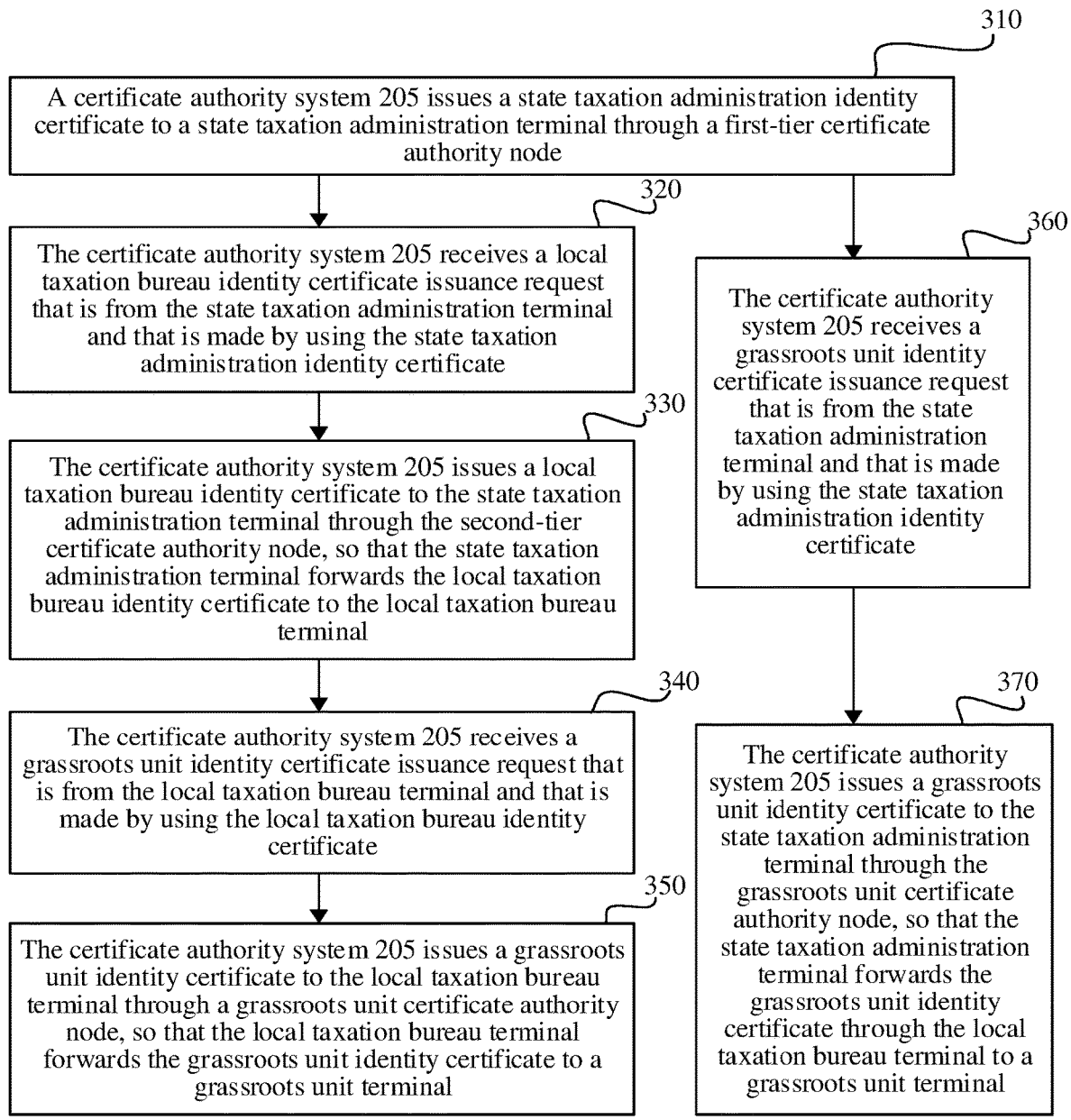
FIG. 7 is a flowchart of a method for issuing an identity certificate to a blockchain node in a taxation blockchain network according to an embodiment of this application.

As shown in FIG. 7, after step 310, in an embodiment, the method also includes the following process performed by the grassroots unit certificate authority node:

Step 360: The certificate authority system 205 receives a grassroots unit identity certificate issuance request that is from the state taxation administration terminal and that is made by using the state taxation administration identity certificate, the grassroots unit identity certificate issuance request being generated in response to a registration request transmitted by the grassroots unit terminal to the state taxation administration terminal through the local taxation bureau terminal.

Step 370: The certificate authority system 205 issues a grassroots unit identity certificate to the state taxation administration terminal through the grassroots unit certificate authority node, so that the state taxation administration terminal forwards the grassroots unit identity certificate through the local taxation bureau terminal to the grassroots unit terminal.

In this embodiment, when the grassroots unit terminal needs to obtain the grassroots unit identity certificate, the grassroots unit terminal transmits the registration request to the local taxation bureau terminal. The local taxation bureau terminal transmits the registration request to the state taxation administration terminal. The state taxation administration terminal transmits a grassroots unit identity certificate issuance request for the grassroots unit terminal.

The implementation processes of step 360 and step 370 are similar to those of step 320 and step 330 in general, except for that in step 360 and step 370, the grassroots unit certificate authority node issues the grassroots unit identity certificate rather than that the second-tier certificate authority node issues the local taxation bureau identity certificate, and after receiving the certificate, the state taxation administration terminal needs to forward the certificate to the grassroots unit terminal through the local taxation bureau terminal.

The advantage of this embodiment is that issuance of the grassroots unit identity certificate can be requested by taxation authority terminals at all tiers, thereby improving the flexibility of certificate issuance.

The root certificate authority node 201, the first-tier certificate authority node 202, the second-tier certificate authority node 203, and the grassroots unit certificate authority node 204 in the foregoing embodiments may be separate hardware devices, or a module run on a hardware device. A plurality of nodes may co-exist on a same hardware device.

Figure 4:
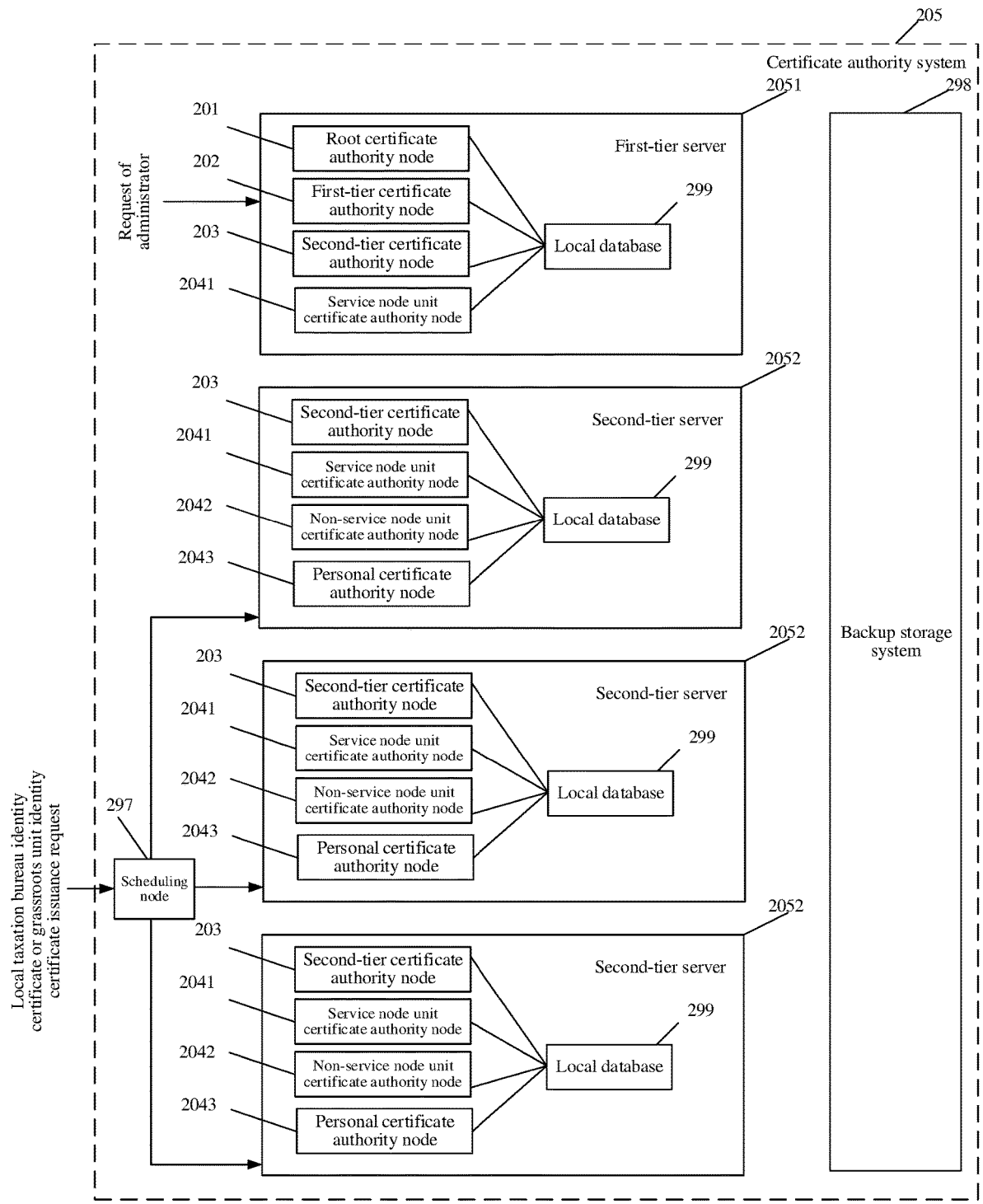
FIG. 4 is a schematic structural diagram of a distributed certificate authority system according to an embodiment of this application.

In an embodiment, as shown in FIG. 4, the certificate authority system 205 includes a first-tier server 2051 and a second-tier server 2052.

The first-tier server 2051 is a server that is used during initialization of settings and that is basically not used when the certificate authority system 205 actually runs, and includes the root certificate authority node 201 and the first-tier certificate authority node 202 that are run as modules. Being used only for generation of the first-tier certificate authority node 202, the second-tier certificate authority node 203, and the grassroots unit certificate authority node 204, the root certificate authority node 201 is only used when the certificate authority system 205 initially runs. Because there may be a limited number of state taxation administration terminals 206, the first-tier certificate authority node 202 only needs to issue a batch of state taxation administration identity certificates to the state taxation administration terminals 206 at an initial stage. Therefore, if the first-tier server 2051 merely includes the root certificate authority node 201 and the first-tier certificate authority node 202, the first-tier server 2051 only needs to be used during initialization, and is no longer used during subsequent running. The first-tier server 2051 also includes other lower-tier certificate authority nodes. In this case, the first-tier server 2051 may also be used as a system performing certificate authorization for the local taxation bureau terminal and the grassroots unit terminal when the certificate authority system 205 runs normally. In this case, as shown in FIG. 4, the first-tier server 2051 may include the second-tier certificate authority node 203 and the service node unit certificate authority node 2041.

The second-tier server 2052 is a main server performing certificate authorization for the local taxation bureau terminal and the grassroots unit terminal when the certificate authority system 205 runs normally. Each second-tier server 2052 may include the second-tier certificate authority node 203 and the grassroots unit certificate authority node 204. As shown in FIG. 4, each second-tier server 2052 includes the second-tier certificate authority node 203, the service node unit certificate authority node 2041, the non-service node unit certificate authority node 2042, and the personal certificate authority node 2043.

Advantages of the foregoing embodiment are that the first-tier server 2051 and the second-tier server 2052 run separately, making it possible for the first-tier server 2051 to not work when the certificate authority system 205 runs normally, reducing the overall power consumption of the certificate authority system 205, making it possible to install the first-tier server 2051 a position relatively far away from various units and taxation bureaus, and improving the overall system usage efficiency.

In addition, because there are a plurality of second-tier servers 2052, a foundation is provided for proper distribution of authorization tasks on different second-tier certificate authority nodes and grassroots unit certificate authority nodes. Specifically, processing loads of second-tier certificate authority nodes and grassroots unit certificate authority nodes may be balanced.

In this embodiment, the certificate authority system 205 further includes a scheduling node 297. The scheduling node 297 distributes an identity certificate issuance request to one of a plurality of grassroots unit certificate authority nodes or a plurality of second-tier certificate authority nodes.

Figure 8:
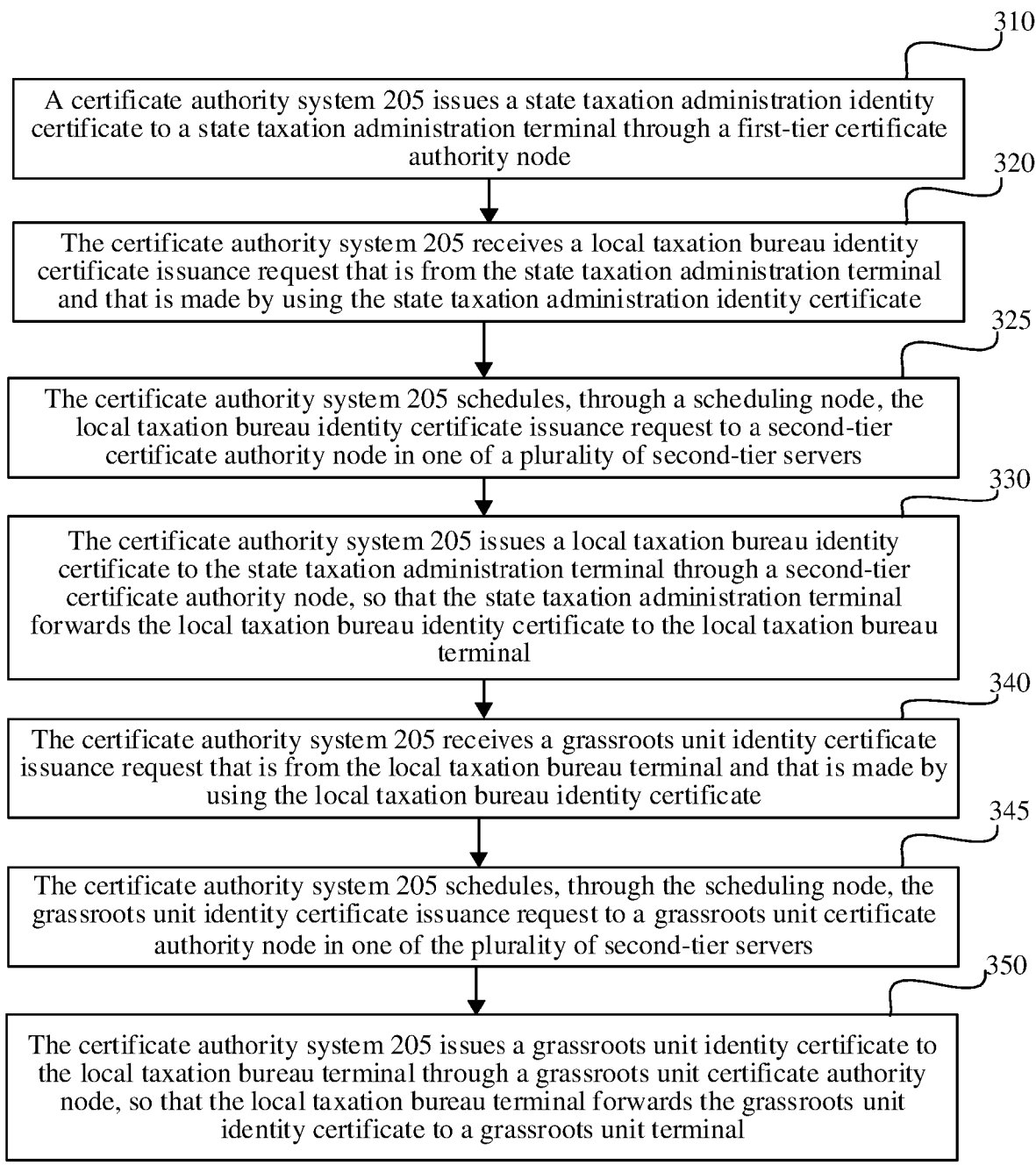
FIG. 8 is a flowchart of a method for issuing an identity certificate to a blockchain node in a taxation blockchain network according to an embodiment of this application.

In this embodiment, as shown in FIG. 8, after step 320, the method further includes:

Step 325: The certificate authority system 205 schedules, through the scheduling node, the local taxation bureau identity certificate issuance request into a second-tier certificate authority node in one of the plurality of second-tier servers.

In an embodiment, the scheduling the local taxation bureau identity certificate issuance request to a second-tier certificate authority node in one of the plurality of second-tier servers includes the following steps:

obtaining numbers of identity certificate issuance requests being processed by the second-tier certificate authority nodes in the plurality of second-tier servers;
  determining, according to the obtained number of identity certificate issuance requests being processed by each second-tier certificate authority node, a target second-tier certificate authority node to which scheduling is performed; and scheduling the local taxation bureau identity certificate issuance request to the target second-tier certificate authority node.

In an embodiment, the step of obtaining numbers of identity certificate issuance requests being processed by the second-tier certificate authority nodes in the plurality of second-tier servers may be performed in a response manner in which the proxy node actively transmits a query request to the second-tier certificate authority nodes in the plurality of second-tier servers, and each second-tier certificate authority node transmits a number of identity certificate issuance requests being processed back to the proxy node.

In another embodiment, the step of obtaining numbers of identity certificate issuance requests being processed by the second-tier certificate authority nodes in the plurality of second-tier servers may be performed in a manner in which a counter is set in each second-tier certificate authority node. One counter is set inside each second-tier certificate authority node. A value of the counter is initially set to 0. Each time the second-tier certificate authority node receives an identity certificate issuance request (including the local taxation bureau identity certificate issuance request and the proxy node communication identity certificate issuance request), the value of the counter is added by 1. Each time the second-tier certificate authority node completes issuance of an identity certificate (including a local taxation bureau identity certificate and a proxy node communication identity certificate), the value of the counter is subtracted by 1. Therefore, the value of the counter reflects the current number of identity certificate issuance requests being processed by the second-tier certificate authority node. The proxy node directly reads, from the counter, a number of identity certificate issuance requests being processed by a second-tier certificate authority node corresponding to the counter.

In an embodiment, the determining, according to the obtained number of identity certificate issuance requests being processed by each second-tier certificate authority node, a target second-tier certificate authority node to which scheduling is performed includes:

determining a second-tier certificate authority node of which the obtained number of identity certificate issuance requests being processed is the smallest as the target second-tier certificate authority node to which scheduling is performed.

In this embodiment, a new local taxation bureau identity certificate issuance request is distributed to a second-tier certificate authority node of which the number of identity certificate issuance requests being processed is the smallest, to balance the number of identity certificate issuance requests being processed by each second-tier certificate authority node. Besides, the number of the identity certificate issuance requests being processed represents a load status of each second-tier certificate authority node. Therefore, in this embodiment, processing loads of the second-tier certificate authority nodes are balanced.

In another embodiment, the determining, according to the obtained number of identity certificate issuance requests being processed by each second-tier certificate authority node, a target second-tier certificate authority node to which scheduling is performed includes:

selecting any one of second-tier certificate authority nodes of which numbers of identity certificate issuance requests being processed are lower than a preset issuance request number threshold as a target second-tier certificate authority node to which scheduling is performed.

In this embodiment, it is considered that if the number of identity certificate issuance requests being processed is less than the preset issuance request number threshold, the load is considered to be relatively light. One can be selected as the target second-tier certificate authority node to which scheduling is performed.

In this way, after the target second-tier certificate authority node is determined, the local taxation bureau identity certificate issuance request can be distributed to the target second-tier certificate authority node for processing.

In an embodiment, as shown in FIG. 8, after step 340, the method further includes:

Step 345: The certificate authority system 205 schedules, through the scheduling node, the grassroots unit identity certificate issuance request to a grassroots unit certificate authority node in one of the plurality of second-tier servers.

In an embodiment, the scheduling the grassroots unit identity certificate issuance request to a grassroots unit certificate authority node in one of the plurality of second-tier servers includes the following steps:

obtaining numbers of grassroots unit identity certificate issuance requests being processed by grassroots unit certificate authority nodes in the plurality of second-tier servers;

determining, according to the obtained number of grassroots unit identity certificate issuance requests being processed by each grassroots unit certificate authority node, a target grassroots unit certificate authority node to which scheduling is performed; and scheduling the grassroots unit identity certificate issuance request to the target grassroots unit certificate authority node.

The foregoing process may be similar to the example process of scheduling, through the scheduling node, the local taxation bureau identity certificate issuance request into a second-tier certificate authority node in one of the plurality of second-tier servers, except for that the grassroots unit identity certificate issuance request is scheduled to the grassroots unit certificate authority node rather than that the local taxation bureau identity certificate issuance request scheduled to the second-tier certificate authority node.

In addition, in an embodiment, each second-tier server 2052 further includes a local database 299, configured to store identity certificates (a local taxation bureau identity certificate and a grassroots unit identity certificate) issued by certificate authority nodes (the second-tier certificate authority node 203 and the grassroots unit certificate authority node 204) in the second-tier server 2052 and store issuance requests for the identity certificates. An issuance request for an identity certificate refers to an identity certificate issuance request in response to which the identity certificate is issued. For example, after receiving the local taxation bureau identity certificate issuance request from the state taxation administration terminal, the second-tier certificate authority node 203 issues a local taxation bureau identity certificate. The local taxation bureau identity certificate issuance request refers to an issuance request for which the local taxation bureau identity certificate is issued.

In this embodiment, after step 330, the method further includes:

storing, by the certificate authority system 205, the issued local taxation bureau identity certificate and the local taxation bureau identity certificate issuance request that is the local taxation bureau identity certificate is for into a local database of a second-tier server in which the second-tier certificate authority node is located.

In this embodiment, after step 350, the method further includes:

storing, by the certificate authority system 205, the issued grassroots unit identity certificate and the grassroots unit identity certificate issuance request that the grassroots unit identity certificate is for into a local database of a second-tier server in which the grassroots unit certificate authority node is located; and regularly synchronizing data stored in the local database with a local database of another second-tier server of the certificate authority system.

The data stored in the local database refers to identity certificates at all tiers and issuance requests for the identity certificates that are stored in a local server, including the foregoing issued local taxation bureau identity certificate, the local taxation bureau identity certificate issuance request for the local taxation bureau identity certificate, the foregoing issued grassroots unit identity certificate, and the grassroots unit identity certificate issuance request for the grassroots unit identity certificate.

The regularly synchronizing data stored in the local database with a local database of another second-tier server of the certificate authority system means that the data stored in the local database is transmitted to another second-tier server of the certificate authority system at preset intervals, for storage on the another second-tier server. In this way, each second-tier server not only stores an identity certificate issued by itself and an issuance request for the identity certificate, but also stores an identity certificate issued by another second-tier server in the certificate authority system and an issuance request for the identity certificate. An advantage of the above is that there is no repetition of public and private keys in identity certificates issues by all second-tier servers in the certificate authority system. When generating public and private keys for a certificate, each second-tier server needs to refer to stored public and private keys of identity certificates issued by all second-tier servers in the certificate authority system, so that the generated public and private keys are different from the public and private keys of the identity certificates issued by all second-tier servers in the certificate authority system, thereby improving the authority of the issued identity certificate.

In an embodiment, as shown in FIG. 4, the certificate authority system 205 further includes a backup storage system 298. The backup storage system is a backup storage space set to avoid a case in which data stored locally by all second-tier servers 2052 is lost and cannot be retrieved. The identity certificates generated by all second-tier servers 2052 and the issuance requests for the identity certificates are not only stored in local databases 299 of the second-tier servers 2052, but also backed up in the backup storage systems 298. An advantage of this is that once data in the local database 299 is lost, the data can be retrieved from the backup storage system 298.

In this embodiment, after the issued local taxation bureau identity certificate and the local taxation bureau identity certificate issuance request for the local taxation bureau identity certificate are stored into a local database of a second-tier server in which the second-tier certificate authority node is located, the method further includes the following step:

The certificate authority system 205 backs up the issued local taxation bureau identity certificate and the local taxation bureau identity certificate issuance request for the local taxation bureau identity certificate into a backup storage region corresponding to the second-tier server in the backup storage system.

The backup storage region refers to a region set in the backup storage system for each second-tier server and used for storing data of the second-tier server. For example, in an example shown in FIG. 4, there are three second-tier servers 2052, and correspondingly, there are three backup storage regions set in the backup storage system.

In this embodiment, after the issued grassroots unit identity certificate and the grassroots unit identity certificate issuance request for the grassroots unit identity certificate are stored into a local database of a second-tier server in which the grassroots unit certificate authority node is located, the method further includes the following steps:

The certificate authority system 205 backs up the issued grassroots unit identity certificate and the grassroots unit identity certificate issuance request for the grassroots unit identity certificate into a backup storage region corresponding to the second-tier server in the backup storage system.

The certificate authority system 205 distributes, through a scheduling node in response to a failure of a second-tier server, the local taxation bureau identity certificate issuance request and the grassroots unit identity certificate issuance request that are not fully served by the second-tier server to another second-tier server.

The certificate authority system 205 restores, in response to failure recovery of the second-tier server, data to a local database of the second-tier server from the backup storage region corresponding to the second-tier server in the backup storage system.

In an embodiment, when there is the scheduling node 297 in FIG. 4, the failure of the second-tier server may be detected by the scheduling node 297. The detection method may include: transmitting, by the scheduling node 297, a monitoring signal to each second-tier server 2052 regularly, and making, by the second-tier server 2052, a monitoring response; and considering that the second-tier server 2052 has a failure when no monitoring response is received from the second-tier server 2052 after a monitoring signal is transmitted to the second-tier server 2052.

In an embodiment, the local taxation bureau identity certificate issuance request and the grassroots unit identity certificate issuance request that are not fully served by the second-tier server are also obtained through the scheduling node 297. A certificate issuance request list is set in the scheduling node 297 for the second-tier servers 2052. Certificate issuance requests distributed to the second-tier servers 2052 for processing are placed in the list. Each certificate issuance request has two states: unprocessed and processed. Before distributing the local taxation bureau identity certificate issuance request and the grassroots unit identity certificate issuance request to the second-tier server, the scheduling node 297 records the local taxation bureau identity certificate issuance request and the grassroots unit identity certificate issuance request into the certificate issuance request list and sets the state of the certificate issuance request list to unprocessed. After issuing a corresponding identity certificate in response to the certificate issuance request, the second-tier certificate authority node 203 and the grassroots unit certificate authority node 204 in the second-tier server 2052 transmits a processing completion notification to the scheduling node 297. After receiving the processing completion notification ton, the scheduling node 297 sets the state of a corresponding certificate issuance request in the list to processed. In this way, by searching the certificate issuance request list for certificate issuance requests of which a state is unprocessed, local taxation bureau identity certificate issuance requests and grassroots unit identity certificate issuance requests that are not fully served by the second-tier server can be determined.

The local taxation bureau identity certificate issuance requests and the grassroots unit identity certificate issuance requests that are not fully served by the second-tier server are distributed to another second-tier server through the scheduling node, and similar to the foregoing embodiments, are distributed to a second-tier server of which a number of certificate issuance requests being processed is the smallest in other second-tier servers or any one of second-tier servers of which numbers of certificate issuance requests being processed are lower than a preset certificate issuance request number threshold in other second-tier servers, to balance the processing loads.

The failure recovery of the server may also be detected in the foregoing manner of transmitting a monitoring signal regularly. If the scheduling node 297 transmits a monitoring signal to a second-tier server 2052 regularly but does not receive a monitoring response from the second-tier server 2052, transmitting a monitoring signal to the second-tier server 2052 regularly is continued, and when a monitoring response from the second-tier server 2052 is received, it is considered that the failure of the second-tier server 2052 is recovered.

When the fault recovery of the second-tier server 2052 is detected, data stored in a backup storage region corresponding to the second-tier server 2052 in the backup storage system 298 is duplicated back to the local database of the second-tier server 2052.

In the foregoing embodiment, after the second-tier server has a failure, related data of an identity certificate stored therein can still be restored, thereby improving the security of the certificate authority system.

Figure 10:
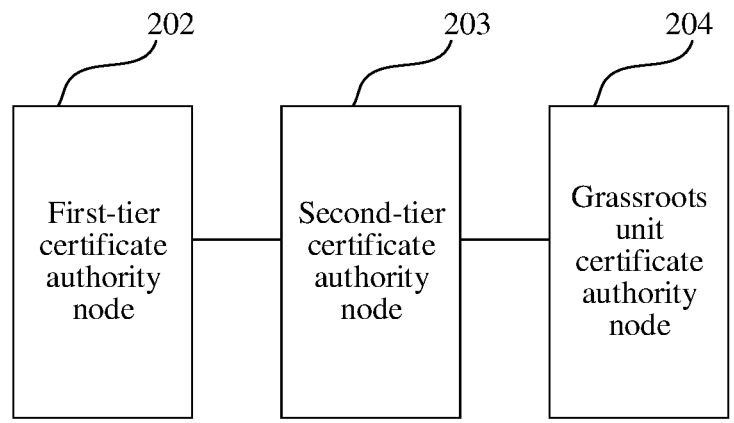
FIG. 10 is a block diagram of a certificate authority system for issuing an identity certificate to a blockchain node in a taxation blockchain network according to an embodiment of this application.

In an embodiment, as shown in FIG. 10, a certificate authority system for issuing an identity certificate to a blockchain node in a taxation blockchain network is provided. The blockchain node in the taxation blockchain network includes a state taxation administration terminal, a local taxation bureau terminal, and a grassroots unit terminal. The certificate authority system includes:
  a first-tier certificate authority node 202, configured to issue a state taxation administration identity certificate to the state taxation administration terminal;
  a second-tier certificate authority node 203, configured to issue a local taxation bureau identity certificate to the state taxation administration terminal in response to a local taxation bureau identity certificate issuance request that is from the state taxation administration terminal and that is made by using the state taxation administration identity certificate, so that the state taxation administration terminal forwards the local taxation bureau identity certificate to the local taxation bureau terminal, the local taxation bureau identity certificate issuance request being generated in response to a registration request transmitted by the local taxation bureau terminal to the state taxation administration terminal; and
  a grassroots unit certificate authority node 204, configured to issue a grassroots unit identity certificate to the local taxation bureau terminal in response to a grassroots unit identity certificate issuance request that is from the local taxation bureau terminal and that is made by using the local taxation bureau identity certificate, so that the local taxation bureau terminal forwards the grassroots unit identity certificate to the grassroots unit terminal, the grassroots unit identity certificate issuance request being generated in response to a registration request transmitted by the grassroots unit terminal to the local taxation bureau terminal having the local taxation bureau identity certificate.

In an embodiment, the certificate authority system further includes a root certificate authority node. The root certificate authority node is generated before the first-tier certificate authority node 202 issues a state taxation administration identity certificate to the state taxation administration terminal. The root certificate authority node is configured to generate a root certificate and generate the first-tier certificate authority node, the second-tier certificate authority node and the grassroots unit certificate authority node based on the root certificate.

In an embodiment, the grassroots unit certificate authority node 204 includes a service node unit certificate authority node, and a non-service node unit certificate authority node, and a personal certificate authority node. The grassroots unit terminal includes a service node unit terminal, a non-service node unit terminal, and a personal terminal. The grassroots unit identity certificate includes a service node unit identity certificate, a non-service node unit identity certificate, and a personal identity certificate. The blockchain node in the taxation blockchain network further includes a proxy node.

In this embodiment, the certificate authority node for the service node unit is configured to issue, when the grassroots unit identity certificate issuance request is for a service node unit, the service node unit identity certificate to the local taxation bureau terminal, so that the local taxation bureau terminal forwards the service node unit identity certificate to the service node unit terminal, the service node unit identity certificate being used for communication of chained information between the service node and the proxy node.

In this embodiment, the certificate authority node for the non-service node unit is configured to issue, when the grassroots unit identity certificate issuance request is for a non-service node unit, the non-service node unit identity certificate to the local taxation bureau terminal, so that the local taxation bureau terminal forwards the non-service node unit identity certificate to the non-service node unit terminal, the non-service node unit identity certificate being used for transfer of basic information of the chained information between the non-service node unit terminal and the service node unit terminal.

In this embodiment, the personal certificate authority node is configured to issue, when the grassroots unit identity certificate issuance request is for an individual, the personal identity certificate to the local taxation bureau terminal, so that the local taxation bureau terminal forwards the personal identity certificate to the personal terminal, the personal identity certificate being used for transfer of the basic information of the chained information between the personal terminal and the service node unit terminal.

In an embodiment, the first-tier certificate authority node 202 is also configured to issue a proxy node initiation identity certificate to the proxy node; and the second-tier certificate authority node 203 is also configured to receive a proxy node communication identity certificate issuance request that is from the proxy node and that is made by using the proxy node initiation identity certificate; and issue a proxy node communication identity certificate to the proxy node through the second-tier certificate authority node, the proxy node communication identity certificate being used for communicating with the service node.

In an embodiment, the second-tier certificate authority node 203 is further configured to:
  receive a grassroots unit identity certificate issuance request that is from the state taxation administration terminal and that is made by using the state taxation administration identity certificate, the grassroots unit identity certificate issuance request being generated in response to a registration request transmitted by the grassroots unit terminal to the state taxation administration terminal through the local taxation bureau terminal; and issue a grassroots unit identity certificate to the state taxation administration terminal, so that the state taxation administration terminal forwards the grassroots unit identity certificate through the local taxation bureau terminal to the grassroots unit terminal.

In an embodiment, the first-tier certificate authority node 202 is further configured to:

generate a public key and a private key of the state taxation administration terminal;

generate the state taxation administration identity certificate for the state taxation administration terminal, the state taxation administration identity certificate including the public key of the state taxation administration terminal; and transmit the state taxation administration identity certificate and the private key of the state taxation administration terminal to the state taxation administration terminal.

In this embodiment, the second-tier certificate authority node 203 is further configured to:

receive the state taxation administration identity certificate from the state taxation administration terminal;

receive the local taxation bureau identity certificate issuance request from the state taxation administration terminal, the local taxation bureau identity certificate issuance request including registration information of the local taxation bureau and a signature signed to the registration information of the local taxation bureau by using the private key of the state taxation administration; and perform, by using the public key of the state taxation administration in the state taxation administration identity certificate, verification on the signature in the local taxation bureau identity certificate issuance request.

In this embodiment, the second-tier certificate authority node 203 is further configured to:

perform authentication on the registration information;

generate a public key and a private key of the local taxation bureau terminal for the local taxation bureau terminal when the authentication succeeds;

generate the local taxation bureau identity certificate for the local taxation bureau terminal, the local taxation bureau identity certificate including the public key of the local taxation bureau terminal; and transmit the local taxation bureau identity certificate and the private key of the local taxation bureau terminal to the state taxation administration terminal, so that the state taxation administration terminal forwards the local taxation bureau identity certificate and the private key of the local taxation bureau terminal to the local taxation bureau terminal, the local taxation bureau identity certificate and the private key of the local taxation bureau terminal being used for communication between the local taxation bureau terminal and another blockchain node in the taxation blockchain network.

In an embodiment, the grassroots unit certificate authority node 204 is further configured to:

receive the local taxation bureau identity certificate from the local taxation bureau terminal;

receive the grassroots unit identity certificate issuance request from the local taxation bureau terminal, the grassroots unit identity certificate issuance request including registration information of the grassroots unit and a signature signed to the registration information of the grassroots unit by using the private key of the local taxation bureau; and perform verification on the signature in the grassroots unit identity certificate issuance request by using the public key of the local taxation bureau in the local taxation bureau identity certificate.

In an embodiment, the grassroots unit certificate authority node 204 is further configured to:

perform authentication on the registration information of the grassroots unit;

generate a public key and a private key of the grassroots unit terminal for the grassroots unit terminal when the authentication succeeds;

generate the grassroots unit identity certificate for the grassroots unit terminal, the grassroots unit identity certificate including the public key of the grassroots unit terminal; and transmit the grassroots unit identity certificate and the private key of the grassroots unit terminal to the local taxation bureau terminal, so that the local taxation bureau terminal forwards the grassroots unit identity certificate and the private key of the grassroots unit terminal to the grassroots unit terminal, the grassroots unit identity certificate and the private key of the grassroots unit terminal being used for communication between the grassroots unit terminal and another blockchain node in the taxation blockchain network.

In an embodiment, the first-tier certificate authority node 202 is further configured to:

generate an initiation public key and an initiation private key of the proxy node;

generate the proxy node initiation identity certificate for the proxy node, the proxy node initiation identity certificate including the initiation public key of the proxy node; and transmit the proxy node initiation identity certificate and the initiation private key of the proxy node to the proxy node.

In this embodiment, the second-tier certificate authority node 203 is further configured to:

receive the proxy node initiation identity certificate from the proxy node;

receive the proxy node communication identity certificate issuance request from the proxy node, the proxy node communication identity certificate issuance request including registration information of the proxy node and a signature signed to the registration information of the proxy node by using the initiation private key of the proxy node;

perform, by using the initiation public key of the proxy node in the proxy node initiation identity certificate, verification on the signature in the proxy node communication identity certificate issuance request;

perform authentication on the registration information of the proxy node;

generate a communication public key and a communication private key of the proxy node for the proxy node when the authentication succeeds;

generate the proxy node communication identity certificate for the proxy node, the proxy node communication identity certificate including the communication public key of the proxy node; and transmit the proxy node communication identity certificate and the communication private key of the proxy node to the proxy node, the proxy node communication identity certificate and the communication private key of the proxy node being used for the proxy node to communicate with the service node.

In an embodiment, the certificate authority system includes a first-tier server and a second-tier server. The first-tier server includes the root certificate authority node and the first-tier certificate authority node. The second-tier server includes the second-tier certificate authority node and the grassroots unit certificate authority node.

In an embodiment, there is a plurality of second-tier servers included in the certificate authority system. Each second-tier server includes the second-tier certificate authority node and the grassroots unit certificate authority node. The certificate authority system further includes a scheduling node. The scheduling node is configured to:

schedule the local taxation bureau identity certificate issuance request to a second-tier certificate authority node in one of the plurality of second-tier servers after receiving the local taxation bureau identity certificate issuance request that is from the state taxation administration terminal and that is made by using the state taxation administration identity certificate; and schedule the grassroots unit identity certificate issuance request to a grassroots unit certificate authority node in one of the plurality of second-tier servers after receiving the grassroots unit identity certificate issuance request that is from the local taxation bureau terminal and that is made by using the local taxation bureau identity certificate.

In an embodiment, each second-tier server further includes a local database. The local database is configured to:

store, after a local taxation bureau identity certificate is issued to the state taxation administration terminal through a second-tier certificate authority node of a second-tier server in which the local database is located, the issued local taxation bureau identity certificate and a local taxation bureau identity certificate issuance request for the local taxation bureau identity certificate; and store, after a grassroots unit identity certificate is issued to the local taxation bureau terminal through a grassroots unit certificate authority node of a second-tier server in which the local database is located, the issued grassroots unit identity certificate and a grassroots unit identity certificate issuance request for the grassroots unit identity certificate, data stored in the local database being regularly synchronized with a local database of another second-tier server of the certificate authority system.

In an embodiment, the certificate authority system further includes a backup storage system. The backup storage system includes a backup storage region corresponding to each second-tier server. The backup storage region is configured to:

store the backed-up local taxation bureau identity certificate and the local taxation bureau identity certificate issuance request for the local taxation bureau identity certificate after the issued local taxation bureau identity certificate and the local taxation bureau identity certificate issuance request for the local taxation bureau identity certificate are stored into a local database of a second-tier server in which the second-tier certificate authority node is located; and store the backed-up grassroots unit identity certificate and the grassroots unit identity certificate issuance request for the grassroots unit identity certificate after the issued grassroots unit identity certificate and the grassroots unit identity certificate issuance request for the grassroots unit identity certificate are stored into a local database of a second-tier server in which the grassroots unit certificate authority node is located. In response to a failure of the second-tier server, the local taxation bureau identity certificate issuance request and the grassroots unit identity certificate issuance request that are not fully served by the second-tier server are distributed to another second-tier server through the scheduling node; and in response to failure recovery of the second-tier server, data is restored to a local database of the second-tier server from a backup storage region corresponding to the second-tier server in the backup storage system.

Figure 11:
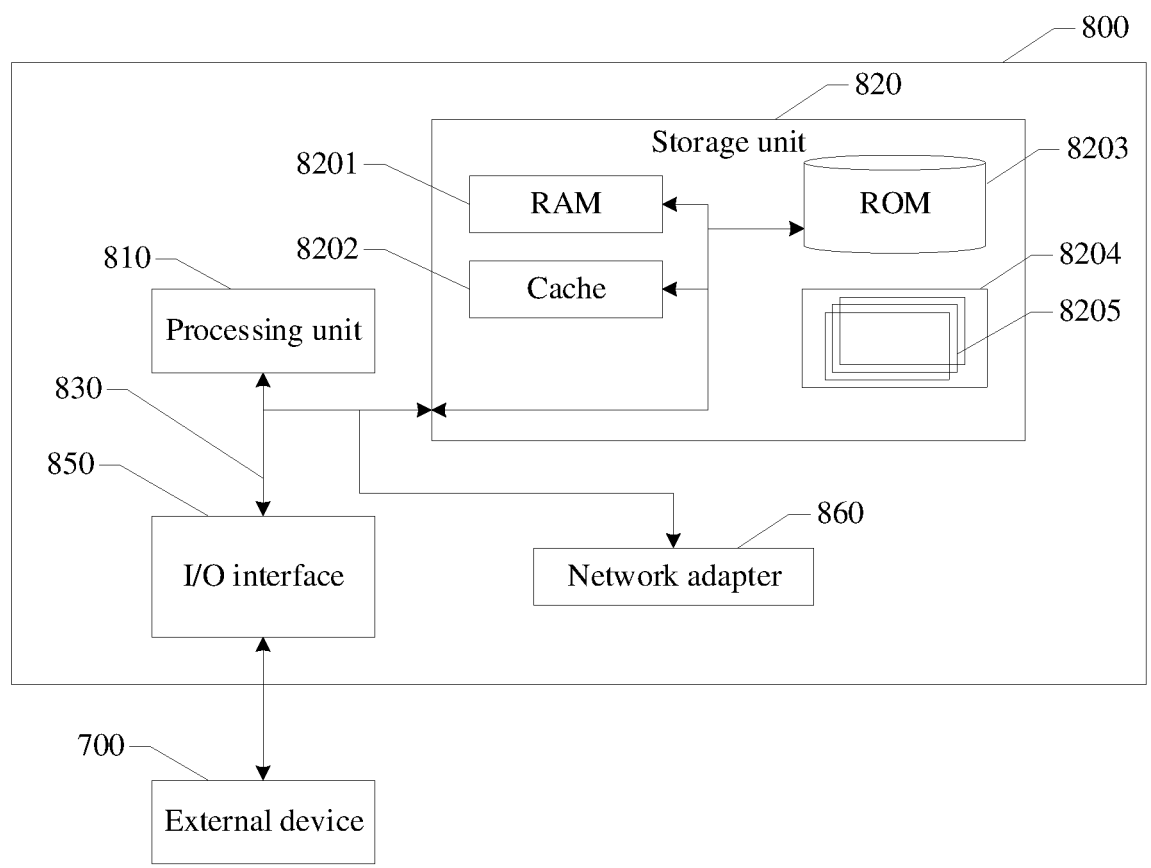
FIG. 11 is a hardware diagram of a computer device according to an embodiment of this application.

Each of the root certificate authority node 201, the first-tier certificate authority node 202, the second-tier certificate authority node 203, the service node unit certificate authority node 2041, the non-service node unit certificate authority node 2042, and the personal certificate authority node 2043 in FIG. 2 can be used as an independent hardware device to be implemented by a computer device 800 in FIG. 11. In addition, the root certificate authority node 201, the first-tier certificate authority node 202, the second-tier certificate authority node 203, the service node unit certificate authority node 2041, the non-service node unit certificate authority node 2042, and the personal certificate authority node 2043 can be used as functional modules separately stored in the same hardware device. The hardware device is implemented as the computer device 800 in FIG. 11.

The computer device 800 according to an embodiment of this application is described below with reference to FIG. 11. A computer device 800 shown in FIG. 11 is only an example, and does not impose any restriction on functions and scopes of use of the embodiments of this application.

As shown in FIG. 11, the computer device 800 is shown in the form of a general computer device. Components of the computer device 800 may include, but are not limited to: at least one processing unit 810, at least one storage unit 820, and a bus 830 connecting different system components (including the storage unit 820 and the processing unit 810).

The storage unit stores program code. The program code, when executed by the processing unit 810, may cause the processing unit 810 to perform the steps according to the example implementations of this application described in the example methods in this specification. For example, the processing unit 810 may perform each step shown in FIG. 5.

The storage unit 820 may include a readable medium in the form of a volatile storage unit, for example, a random access memory (RAM) 8201 and/or a cache storage unit 8202, and may further include a read-only memory (ROM) 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may represent one or more of several types of bus structures, including a storage unit bus or storage unit controller, a peripheral bus, an accelerated graphics port, a processing unit, or a local bus using any one of a plurality of bus structures.

The computer device 800 may alternatively communicate with one or more external devices 700 (such as a keyboard, a pointing device, and a Bluetooth device), may alternatively communicate with a plurality of devices that enable a user to interact with the computer device 800, and/or communicate with any device (such as router or a modem) that enables the computer device 800 to communicate with one or more other computing devices. Such communication may be performed by using an input/output (I/O) interface 850. In addition, the computer device 800 may further communicate with one or more networks (for example, a local area network (LAN), a wide area network (WAN), and/or a public network, such as Internet) by using a network interface controller 860. As shown in the figure, the network adapter 860 communicates with other modules through the bus 830 and the computer device 800. It is to be understood that although not shown in the figure, other hardware and/or software modules may be used in combination with the computer device 800, including, but not limited to microcode, a device drive, a redundancy processing unit, an external disk drive array, a RAID system, a tape drive, a data backup storage system, or the like.

The embodiments of this application further provide a storage medium, the storage medium being configured to store a computer program, the computer program being configured to perform the method for issuing an identity certificate to a blockchain node in a taxation blockchain network provided in the foregoing embodiments.

The embodiments of this application further provide a computer program product including instructions, the computer program product, when run on a server, causing the server to perform the method for issuing an identity certificate to a blockchain node in a taxation blockchain network provided in the foregoing embodiments.

According to the foregoing descriptions of the implementations, a person skilled in the art may readily understand that the example implementations described herein may be implemented by using software, or may be implemented by combining software and necessary hardware. Therefore, the technical solutions of the implementations of this application may be implemented in a form of a software product. The software product may be stored in a non-volatile storage medium (which may be a compact disc read-only memory (CD-ROM), a USB flash drive, a removable hard disk, or the like) or in a network and includes several instructions for instructing a computing device (which may be a personal computer, a server, a terminal device, a network device, or the like) to perform the methods described in the implementations of this application.

In an example embodiment of this application, a computer program medium is further provided, storing computer-readable instructions, the computer-readable instructions, when executed by a processor of a computer, causing the computer to perform the method described in the foregoing method embodiments.

According to an embodiment of this application, a program product for performing the method in the foregoing method embodiments is further provided. The program product may use a portable CD-ROM and include program code, and may be run on a terminal device such as a personal computer. However, the program product of this application is not limited to this. In this specification, the readable storage medium may be any tangible medium including or storing a program, and the program may be used by or in combination with an instruction execution system, apparatus, or device.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The computer-readable signal medium may include a data signal propagated in a baseband or as part of a carrier, and stores readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code used for executing the operations of this application may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified.

In addition, although the various steps of the method in this application are described in a specific order in the accompanying drawings, this does not require or imply that the steps are bound to be performed in the specific order, or all the steps shown are bound to be performed to achieve the expected result. Additionally or alternatively, some steps may be omitted, a plurality of steps may be combined into one step for execution, and/or one step may be decomposed into a plurality of steps for execution, and the like.

According to the foregoing descriptions of the implementations, a person skilled in the art may readily understand that the example implementations described herein may be implemented by using software, or may be implemented by combining software and necessary hardware. Therefore, the technical solutions of the implementations of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a mobile terminal, a network device, or the like) to perform the methods according to the implementations of this application.

After considering the specification and practicing the embodiments disclosed herein, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application. The specification and the embodiments are merely considered as examples, and the actual scope and the spirit of this application are pointed out by the following claims.

What is claimed is:

1. A method for issuing an identity certificate to a blockchain node in a blockchain network, the blockchain node in the blockchain network comprising:
   a first terminal;
   a second terminal;
   a third terminal; and
   a certificate authority system comprising a first-tier certificate authority node, a second-tier certificate authority node, and a third-tier certificate authority node;
   wherein the method, performed by the certificate authority system, comprises:
      issuing a first identity certificate to the first terminal through the first-tier certificate authority node;
      receiving a second identity certificate issuance request that is from the first terminal and that is made by using the first identity certificate, wherein the second identity certificate issuance request is generated in response to a registration request transmitted by the second terminal to the first terminal;
      issuing a second identity certificate to the first terminal through the second-tier certificate authority node, wherein the first terminal forwards the second identity certificate to the second terminal;
      receiving a third identity certificate issuance request that is from the second terminal and that is made by using the second identity certificate, the third identity certificate issuance request being generated in response to a registration request transmitted by the third terminal to the second terminal having the second identity certificate; and
      issuing a third identity certificate to the second terminal through the third-tier certificate authority node, wherein the second terminal forwards the third identity certificate to the third terminal.

2. The method according to claim 1, wherein the certificate authority system further comprises a root certificate authority node, and before the issuing the first identity certificate, the method further comprises:
   generating the root certificate authority node;
   generating a root certificate through the root certificate authority node; and
   generating the first-tier certificate authority node, the second-tier certificate authority node, and the third-tier certificate authority node based on the root certificate.

3. The method according to claim 1, wherein the third-tier certificate authority node comprises a certificate authority node of a service node unit, a certificate authority node of a non-service node unit, and a personal certificate authority node, wherein the third terminal comprises a service node unit terminal, a non-service node unit terminal, and a personal terminal, further wherein the grassroots unit identity certificate comprises a service node unit identity certificate, a non-service node unit identity certificate, and a personal identity certificate, and the blockchain node further comprises a proxy node; and
   wherein the issuing the third identity certificate further comprises:
      issuing, when the third identity certificate issuance request is for a service node unit, the service node unit identity certificate to the second terminal, so that the second terminal forwards the service node unit identity certificate to the service node unit terminal, the service node unit identity certificate being used for communication of chained information between the service node and the proxy node;
      issuing, when the third identity certificate issuance request is for a non-service node unit, the non-service node unit identity certificate to the second terminal, so that the second terminal forwards the non-service node unit identity certificate to the non-service node unit terminal, the non-service node unit identity certificate being used for transfer of basic information of the chained information between the non-service node unit terminal and the service node unit terminal; and
      issuing, when the third identity certificate issuance request is for an individual, the personal identity certificate to the second terminal, so that the second terminal forwards the personal identity certificate to the personal terminal, the personal identity certificate being used for transfer of the basic information of the chained information between the personal terminal and the service node unit terminal.

4. The method according to claim 3, further comprising:
   issuing a proxy node initiation identity certificate to the proxy node through the first-tier certificate authority node;
   receiving a proxy node communication identity certificate issuance request that is from the proxy node and that is made by using the proxy node initiation identity certificate; and
   issuing a proxy node communication identity certificate to the proxy node through the second-tier certificate authority node, the proxy node communication identity certificate being used for communicating with the service node.

5. The method according to claim 1, wherein after the issuing the first identity certificate further comprises:
   receiving a third identity certificate issuance request that is from the first terminal and that is made by using the first identity certificate, the third identity certificate issuance request being generated in response to a registration request transmitted by the third terminal to the first terminal through the second terminal; and issuing a third identity certificate to the first terminal through the third-tier certificate authority node, so that the first terminal forwards the third identity certificate through the second terminal to the third terminal.

6. The method according to claim 1, wherein the issuing the first identity certificate through the first-tier certificate authority node further comprises:
generating a public key and a private key of the first terminal by using the first-tier certificate authority node;
generating the first identity certificate for the first terminal, the first identity certificate comprising the public key of the first terminal; and
transmitting the first identity certificate and the private key of the first terminal to the first terminal; and
the receiving a second identity certificate issuance request that is from the first terminal and that is made by using the first identity certificate further comprises:
receiving the first identity certificate from the first terminal;
receiving the second identity certificate issuance request from the first terminal, the second identity certificate issuance request comprising registration information of the local taxation bureau and a signature signed to the registration information of the local taxation bureau by using the private key of the state taxation administration; and
performing, by using the public key of the state taxation administration in the first identity certificate, a verification on the signature in the second identity certificate issuance request.

7. The method according to claim 1, wherein the issuing a second identity certificate to the first terminal through the second-tier certificate authority node further comprises:
performing authentication on the registration information by using the second-tier certificate authority node;
generating a public key and a private key of the second terminal for the second terminal when the authentication succeeds;
generating the second identity certificate for the second terminal, the second identity certificate comprising the public key of the second terminal; and
transmitting the second identity certificate and the private key of the second terminal to the first terminal, so that the first terminal forwards the second identity certificate and the private key of the second terminal to the second terminal, the second identity certificate and the private key of the second terminal being used for communication between the second terminal and another blockchain node in the blockchain network.

8. The method according to claim 7, wherein the communication between the second terminal and another blockchain node in the blockchain network comprises:
transmitting, by the second terminal, the second identity certificate to the another blockchain node;
signing, by the second terminal by using the private key of the second terminal, a signature to content to be transmitted to the another blockchain node; and
transmitting, by the second terminal, the content and the signature to the another blockchain node together, so that the another blockchain node performs verification on the signature by using the public key in the second identity certificate.

9. The method according to claim 7, wherein the receiving of the third identity certificate issuance request further comprises:
receiving the second identity certificate from the second terminal;
receiving the third identity certificate issuance request from the second terminal, the third identity certificate issuance request comprising registration information of the grassroots unit and a signature signed to the registration information of the grassroots unit by using the private key of the local taxation bureau; and
performing verification on the signature in the third identity certificate issuance request by using the public key of the local taxation bureau in the second identity certificate.

10. The method according to claim 1, wherein the issuing a third identity certificate to the second terminal through the third-tier certificate authority node further comprises:
performing authentication on the registration information of the grassroots unit by using the third-tier certificate authority node;
generating a public key and a private key of the third terminal for the third terminal when the authentication succeeds;
generating the third identity certificate for the third terminal, the third identity certificate comprising the public key of the third terminal; and
transmitting the third identity certificate and the private key of the third terminal to the second terminal, so that the second terminal forwards the third identity certificate and the private key of the third terminal to the third terminal, the third identity certificate and the private key of the third terminal being used for communication between the third terminal and another blockchain node in the blockchain network.

11. The method according to claim 10, wherein the communication between the third terminal and the another blockchain node in the blockchain network comprises:
transmitting, by the third terminal, the third identity certificate to the another blockchain node;
signing, by the third terminal by using the private key of the third terminal, a signature to content to be transmitted to the another blockchain node; and
transmitting, by the third terminal, the content and the signature to the another blockchain node together, so that the another blockchain node performs verification on the signature by using the public key in the third identity certificate.

12. The method according to claim 4, wherein the issuing a proxy node initiation identity certificate to the proxy node through the first-tier certificate authority node further comprises:
generating an initiation public key and an initiation private key of the proxy node by using the first-tier certificate authority node;
generating the proxy node initiation identity certificate for the proxy node, the proxy node initiation identity certificate comprising the initiation public key of the proxy node; and
transmitting the proxy node initiation identity certificate and the initiation private key of the proxy node to the proxy node; and
wherein the receiving the proxy node communication identity certificate issuance request further comprises:
receiving the proxy node initiation identity certificate from the proxy node;
receiving the proxy node communication identity certificate issuance request from the proxy node, the proxy node communication identity certificate issuance request comprising registration information of the proxy node and a signature signed to the registration information of the proxy node by using the initiation private key of the proxy node; and performing, by using the initiation public key of the proxy node in the proxy node initiation identity certificate, verification on the signature in the proxy node communication identity certificate issuance request; and wherein the issuing the proxy node communication identity certificate to the proxy node through the second-tier certificate authority node further comprises:

performing authentication on the registration information of the proxy node by using the second-tier certificate authority node;

generating a communication public key and a communication private key of the proxy node for the proxy node when the authentication succeeds;

generating the proxy node communication identity certificate for the proxy node, the proxy node communication identity certificate comprising the communication public key of the proxy node; and transmitting the proxy node communication identity certificate and the communication private key of the proxy node to the proxy node, the proxy node communication identity certificate and the communication private key of the proxy node being used for the proxy node to communicate with the service node.

13. A certificate authority system for issuing an identity certificate to a blockchain node in a blockchain network, wherein the blockchain node comprises a first terminal, a second terminal, and a third terminal, wherein the certificate authority system comprises:

a first-tier certificate authority node configured to issue a first identity certificate to the first terminal;

a second-tier certificate authority node configured to issue a second identity certificate to the first terminal in response to a second identity certificate issuance request that is from the first terminal and that is made by using the first identity certificate, so that the first terminal forwards the second identity certificate to the second terminal, the second identity certificate issuance request being generated in response to a registration request transmitted by the second terminal to the first terminal; and a third-tier certificate authority node configured to issue a third identity certificate to the second terminal in response to a third identity certificate issuance request that is from the second terminal and that is made by using the second identity certificate, such that the second terminal forwards the third identity certificate to the third terminal, and the third identity certificate issuance request is generated in response to a registration request transmitted by the third terminal to the second terminal having the second identity certificate.

14. The certificate authority system of claim 13, further comprising a root certificate authority node, and before the issuing the first identity certificate, the certificate authority system is configured to generate the root certificate authority node, generate a root certificate through the root certificate authority node, and generate the first-tier certificate authority node, the second-tier certificate authority node, and the third-tier certificate authority node based on the root certificate.

15. The certificate authority system of claim 13, wherein the third-tier certificate authority node comprises a certificate authority node of a service node unit, a certificate authority node of a non-service node unit, and a personal certificate authority node, wherein the third terminal comprises a service node unit terminal, a non-service node unit terminal, and a personal terminal, further wherein the third identity certificate comprises a service node unit identity certificate, a non-service node unit identity certificate, and a personal identity certificate, and the blockchain node further comprises a proxy node.

16. The certificate authority system of claim 15, wherein the certificate authority system is configured to issue the third identity certificate by:

issuing, when the third identity certificate issuance request is for a service node unit, the service node unit identity certificate to the second terminal, so that the second terminal forwards the service node unit identity certificate to the service node unit terminal, the service node unit identity certificate being used for communication of chained information between the service node and the proxy node;

issuing, when the third identity certificate issuance request is for a non-service node unit, the non-service node unit identity certificate to the second terminal, so that the second terminal forwards the non-service node unit identity certificate to the non-service node unit terminal, the non-service node unit identity certificate being used for transfer of basic information of the chained information between the non-service node unit terminal and the service node unit terminal; and issuing, when the third identity certificate issuance request is for an individual, the personal identity certificate to the second terminal, so that the second terminal forwards the personal identity certificate to the personal terminal, the personal identity certificate being used for transfer of the basic information of the chained information between the personal terminal and the service node unit terminal.

17. The certificate authority system of claim 16, wherein the certificate authority system is further configured for:

issuing a proxy node initiation identity certificate to the proxy node through the first-tier certificate authority node;

receiving a proxy node communication identity certificate issuance request that is from the proxy node and that is made by using the proxy node initiation identity certificate; and issuing a proxy node communication identity certificate to the proxy node through the second-tier certificate authority node, the proxy node communication identity certificate being used for communicating with the service node.

18. The certificate authority system of claim 16, wherein the second-tier certificate authority node configured to issue a second identity certificate to the first terminal is further configured for:

performing authentication on the registration information by using the second-tier certificate authority node;

generating a public key and a private key of the second terminal for the second terminal when the authentication succeeds;

generating the second identity certificate for the second terminal, the second identity certificate comprising the public key of the second terminal; and transmitting the second identity certificate and the private key of the second terminal to the first terminal, so that the first terminal forwards the second identity certificate and the private key of the second terminal to the second terminal, the second identity certificate and the private key of the second terminal being used for communication between the second terminal and another blockchain node in the blockchain network.

19. A computer device is provided, comprising:
- a memory, configured to store computer-readable instructions; and
- a processor, configured to read the computer-readable instructions stored in the memory to perform issuing an identity certificate to a blockchain node in a blockchain network, wherein the blockchain node in the blockchain network includes a first terminal, a second terminal, a third terminal, and a certificate authority system comprising a first-tier certificate authority node, a second-tier certificate authority node, and a third-tier certificate authority node;
- wherein the processor is configured for:
    - issuing a first identity certificate to the first terminal through the first-tier certificate authority node;
    - receiving a second identity certificate issuance request that is from the first terminal and that is made by using the first identity certificate, wherein the second identity certificate issuance request is generated in response to a registration request transmitted by the second terminal to the first terminal;
    - issuing a second identity certificate to the first terminal through the second-tier certificate authority node, wherein the first terminal forwards the second identity certificate to the second terminal;
    - receiving a third identity certificate issuance request that is from the second terminal and that is made by using the second identity certificate, the third identity certificate issuance request being generated in response to a registration request transmitted by the third terminal to the second terminal having the second identity certificate; and
    - issuing a third identity certificate to the second terminal through the third-tier certificate authority node, wherein the second terminal forwards the third identity certificate to the third terminal.

20. A non-transitory computer readable medium having stored therein computer program instructions, the computer program instructions, when executed by a processor, causing the processor to implement the method according to claim 1.

* * * * *